US009160236B2

(12) United States Patent
Adragna et al.

(10) Patent No.: US 9,160,236 B2
(45) Date of Patent: Oct. 13, 2015

(54) BURST-MODE CONTROL METHOD FOR LOW INPUT POWER CONSUMPTION IN RESONANT CONVERTERS AND RELATED CONTROL DEVICE

(71) Applicant: STMicroelectronics S.r.l., Agrate Brianza (IT)

(72) Inventors: Claudio Adragna, Monza (IT); Claudio Spini, Monza (IT); Aldo Vittorio Novelli, S. Lorenzo Parabiago (IT); Fabrizio Bognanni, Piacenza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 132 days.

(21) Appl. No.: 13/931,564

(22) Filed: Jun. 28, 2013

(65) Prior Publication Data

US 2014/0016362 A1  Jan. 16, 2014

(30) Foreign Application Priority Data

Jul. 16, 2012  (IT) .............................. MI2012A1231

(51) Int. Cl.
*H02M 3/335* (2006.01)
*H02M 3/337* (2006.01)
*H02M 1/00* (2007.01)

(52) U.S. Cl.
CPC ........ *H02M 3/33507* (2013.01); *H02M 3/3376* (2013.01); *H02M 2001/0035* (2013.01); *Y02B 70/1433* (2013.01); *Y02B 70/16* (2013.01)

(58) Field of Classification Search
CPC .................. H02M 3/3376; H02M 2001/0032; H02M 2001/0035; H02M 2001/0058
USPC ............................................ 363/21.01–21.18
See application file for complete search history.

(56) References Cited

U.S. PATENT DOCUMENTS

| 6,292,376 | B1 * | 9/2001 | Kato ........................... 363/21.09 |
| 6,724,174 | B1 * | 4/2004 | Esteves et al. ................ 323/224 |
| 7,394,669 | B2 * | 7/2008 | Fahlenkamp et al. ....... 363/21.15 |
| 2003/0231012 | A1 * | 12/2003 | Corva et al. .................... 323/285 |
| 2006/0044845 | A1 * | 3/2006 | Fahlenkamp et al. ....... 363/21.15 |

(Continued)

OTHER PUBLICATIONS

L6599, "High-Voltage Resonant Controller," XP-002525804, www.st.com, May 2006, 36 pgs.

(Continued)

*Primary Examiner* — Timothy J Dole
*Assistant Examiner* — Yusef Ahmed
(74) *Attorney, Agent, or Firm* — Seed IP Law Group PLLC

(57) ABSTRACT

An effective method enhances energy saving at low load in a resonant converter with a hysteretic control scheme for implementing burst-mode at light load. The method causes a current controlled oscillator of the converter to stop oscillating when a feedback control current of the output voltage of the converter reaches a first threshold value, and introduces a nonlinearity in the functional relation between the frequency of oscillation and said feedback control current or in a derivative of the functional relation, while the control current is between a lower, second threshold value and the first threshold value, such that the frequency of oscillation remains equal or smaller than the frequency of oscillation when the control current is equal to the second threshold value. Several circuital implementations are illustrated, all of simple realization without requiring any costly microcontroller.

24 Claims, 20 Drawing Sheets

(56) References Cited

U.S. PATENT DOCUMENTS

| | | | |
|---|---|---|---|
| 2008/0030178 A1* | 2/2008 | Leonard et al. | 323/282 |
| 2008/0037289 A1* | 2/2008 | Yang | 363/9 |
| 2008/0062725 A1* | 3/2008 | Yang | 363/21.1 |
| 2008/0298095 A1* | 12/2008 | Chuang et al. | 363/21.12 |
| 2009/0153124 A1* | 6/2009 | Ishii | 323/290 |
| 2009/0201705 A1* | 8/2009 | Murata et al. | 363/53 |
| 2009/0213626 A1* | 8/2009 | Yang | 363/74 |
| 2009/0219000 A1* | 9/2009 | Yang | 323/282 |
| 2009/0244934 A1 | 10/2009 | Wang et al. | |
| 2009/0284994 A1* | 11/2009 | Lin et al. | 363/21.13 |
| 2010/0008110 A1* | 1/2010 | Huang et al. | 363/21.18 |
| 2010/0039836 A1* | 2/2010 | Gong et al. | 363/21.13 |
| 2011/0051470 A1* | 3/2011 | Li et al. | 363/21.15 |
| 2011/0085354 A1* | 4/2011 | Wang et al. | 363/21.02 |
| 2011/0085355 A1* | 4/2011 | Adragna | 363/21.03 |
| 2011/0157920 A1* | 6/2011 | Adragna et al. | 363/21.03 |
| 2011/0157926 A1* | 6/2011 | Adragna | 363/23 |
| 2011/0157927 A1* | 6/2011 | Adragna et al. | 363/26 |
| 2011/0176335 A1* | 7/2011 | Li et al. | 363/21.02 |
| 2011/0204866 A1* | 8/2011 | Moon et al. | 323/284 |
| 2012/0069608 A1* | 3/2012 | Yang et al. | 363/21.12 |
| 2012/0081084 A1* | 4/2012 | Yang et al. | 323/235 |
| 2012/0099344 A1* | 4/2012 | Adragna | 363/21.03 |
| 2012/0201055 A1* | 8/2012 | Moon et al. | 363/21.02 |
| 2012/0230064 A1* | 9/2012 | Yang et al. | 363/21.15 |
| 2012/0250360 A1* | 10/2012 | Orr et al. | 363/21.02 |
| 2013/0010503 A1* | 1/2013 | Choi | 363/26 |
| 2013/0128623 A1* | 5/2013 | Hosotani | 363/21.01 |
| 2013/0134894 A1* | 5/2013 | Kuang | 315/224 |
| 2013/0229829 A1* | 9/2013 | Zhang et al. | 363/16 |
| 2013/0258722 A1* | 10/2013 | Wang et al. | 363/21.12 |
| 2014/0043002 A1* | 2/2014 | Chung et al. | 323/283 |
| 2014/0307478 A1* | 10/2014 | Leisten | 363/15 |
| 2014/0369097 A1* | 12/2014 | Prescott et al. | 363/89 |

OTHER PUBLICATIONS

Liu, Y., "High Efficiency Optimization of LLC Resonant Converter for Wide Load Range," Thesis submitted to faculty of Virginia Polytechnic Institute and State University, Dec. 4, 2007, 119 pgs.

Feng, W. et al., "LLC Resonant Converter Burst Mode Control with Constant Burst Time and Optimal Switching Pattern," Twenty-Sixth Annual IEEE Applied Power Electronics Conference and Exposition (APEC), Fort Worth, TX, pp. 6-12, Mar. 6-11, 2011.

Qin, J. et al., "Light Load Efficiency Enhancement of a LLC Resonant Converter," Twenty-Sixth Annual IEEE Applied Power Electronics Conference and Exposition (APEC), Fort Worth, TX, pp. 1764-1768, Mar. 6-11, 2011.

Wang, B. et al., "Analysis and Implementation of LLC Burst Mode for Light Load Efficiency Improvement," Twenty-Fourth Annual Applied Power Electronics Conference and Exposition (APEC), Washington, DC, pp. 58-64, Feb. 15-19, 2009.

* cited by examiner

FIG. 3 *(Prior Art)*

BURST-MODE CONTROL METHOD FOR LOW INPUT POWER CONSUMPTION IN RESONANT CONVERTERS AND RELATED CONTROL DEVICE

BACKGROUND

1. Technical Field

The present disclosure concerns in general resonant switching converters circuits and in particular a control method of a resonant dc-dc converter aimed to optimize conversion efficiency (i.e., the ratio between the power provided to the load and that drawn from the input source) at low load, and a circuital implementation thereof, preferably realized in integrated form.

2. Description of the Related Art

Resonant converters represent a broad class of switching converters and include a resonant circuit playing an active role in determining the input-output power flow. In these converters, a bridge (half-bridge) consisting of four (or two) power switches (typically power MOSFETs) supplied by a dc voltage generates a square voltage wave that is applied to a resonant circuit (also termed resonant tank) tuned to a frequency close to the fundamental frequency of the square wave. Because of its selective response, the resonant circuit mainly responds to the fundamental component and negligibly to the higher order harmonics of the square wave. As a result, the circulating power may be modulated by varying the frequency of the square wave, holding the duty cycle constant at 50%. Moreover, depending on the resonant circuit configuration, the currents and/or voltages associated with the power flow have a sinusoidal or piecewise sinusoidal shape.

These voltages and/or currents are rectified and filtered so as to provide DC power to the load. In offline applications (i.e., those operated from the power line), the rectification and filtering system supplying the load is coupled to the resonant tank circuit by means of a transformer providing galvanic isolation between the source and the load, to comply with safety regulations. As in every isolated dc-dc converters, also in this case a distinction is made between a primary side (as related to the primary winding of the transformer) connected to the input source and a secondary side (as related to the secondary winding(s) of the transformer) providing power to the load through the rectification and filtering system.

As an example of resonant converter, FIG. 1 shows the so-called LLC resonant converter, probably today's most widely used resonant converter, especially in its half-bridge version. The designation LLC stems from the fact that the resonant tank employs two inductors (L) and a capacitor (C).

The resonant converter comprises a "totem-pole" of transistors M1 and M2 connected between the input voltage source node Vin and ground GND, controlled by a control circuit. The common terminal HB between the transistors M1 and M2 is connected to a resonant tank comprising a series of a capacitor Cr, an inductance Ls and another inductance Lp connected in parallel to a transformer with a center-tap secondary winding. The two windings of the center-tap secondary are connected to the anodes of two diodes D1 and D2, whose cathodes are both connected to the parallel of a capacitor Cout and a resistance Rout; the output voltage Vout of the resonant converter is across said parallel while the DC output current Iout flows through Rout.

Resonant converters offer considerable advantages as compared to traditional switching converters (which are not resonant, but typically PWM—Pulse Width Modulation—controlled): waveforms without steep edges, low switching losses in the power switches due to their soft-switching operation, high conversion efficiency (>95% is easily reachable), ability to operate at high frequencies, low EMI generation (Electro-Magnetic Interference). All these features make resonant converters ideal candidates when high power density is to be achieved, that is, when conversion systems capable of handling considerable power levels in a relatively small space are preferred.

As in most DC-DC converters, the output voltage is kept constant against changes in the operating conditions (i.e., the input voltage Vin and the output current Iout) through a control system that uses closed-loop negative feedback. As shown in the block diagram of FIG. 2, this is achieved by comparing a portion of the output voltage Vout to a reference voltage Vref, their difference (error signal) is amplified by an error amplifier whose output Vc (control voltage) is transferred to the primary side across the isolation boundary typically via an optocoupler. The optocoupler changes the control voltage Vc into a control current $I_{FB}$. Note that normally the circuit arrangement comprising the error amplifier and the optocoupler is such that the control voltage Vc and the control current $I_{FB}$ change in opposite directions: if Vc increases $I_{FB}$ decreases, if Vc decreases, $I_{FB}$ increases. The control current $I_{FB}$ modifies a quantity X within the converter which the power carried by the converter substantially depends on.

In resonant converters, as mentioned earlier, this significant quantity is the switching frequency of the square wave stimulating the resonant tank ($X=f_{sw}$). In nearly all practical resonant converters, if frequency rises the delivered power decreases and vice versa.

A consideration common to many applications of switching converters, resonant and not, is that conversion efficiency is maximized also under light load conditions to comply with regulations and recommendations on energy saving (e.g., EnergyStar, CEC, Eu CoC, Climate Savers, etc.).

A popular technique for optimizing light load efficiency in all switching converters (resonant and not) is to make them work in the so-called "burst-mode". With this operating mode the converter works intermittently, with series (bursts) of switching cycles separated by time intervals during which the converter does not switch (idle time). When the load is such that the converter has just entered burst-mode operation, the idle time is short; as the load decreases, the duration of the bursts decreases as well and the idle time increases. In this way, the average switching frequency is considerably reduced and, consequently, so is the effect of the two major contributors to power losses at light load:

1) switching losses associated to the parasitic elements in the converter
2) conduction losses related to the flow of reactive current in the resonant tank (e.g., the magnetizing current in the transformer). In fact, this current only flows while the converter is switching and is essentially zero during the idle time.

The duration of the bursts and the idle time are determined by the feedback loop so that the output voltage of the converter always remains under control. To explain the mechanism governing this operation it is convenient to refer to a concrete example.

FIG. 3 shows how burst-mode operation is implemented in the integrated control circuit L6599 by STMicroelectronics, as well as a simplified schematic of its internal current-controlled oscillator (CCO). FIG. 4 shows the oscillator waveform of the CCO, its relationship with the gate drive signals for M1 and M2 produced by the pulse-train generator and the voltage of the half-bridge midpoint HB, i.e., the square wave voltage applied to the resonant tank.

The CCO is programmed by means of the capacitor $C_1$ connected from pin CF to ground and by the current $I_R$ sourced by the pin RFmin, which provides an accurate reference voltage Vr (=2 V). $I_R$ is internally mirrored and a current $K_M \cdot I_R$ is alternately sourced and sunk from pin CF, originating a symmetrical triangular waveform included between a peak value (=3.9 V) and a valley value (=0.9 V) across $C_1$. As a result, the higher the current $I_R$, the faster $C_1$ is charged and discharged and the higher the oscillation and switching frequency ($f_{osc}$). Denoting with $\Delta V_{osc}$, the peak-to-valley swing of the oscillator (=3 V), the following relationship can be found:

$$f_{osc} = \frac{K_M I_R}{2\Delta V_{osc} C_1}$$

The current $I_R$ is the sum of the current flowing through $R_1$ (=Vr/$R_1$) and the current $I_{FB}$ sunk by the phototransistor of the optocoupler OC that transfers the control voltage Vc across the isolation boundary. Therefore, the current $I_{FB}$ actually modulates $I_R$, closing the feedback loop that regulates the output voltage of the converter and making it work at a frequency given by:

$$f_{sw} = f_{osc} = \frac{K_M}{2\Delta V_{osc} C_1}\left(\frac{Vr}{R_1} + I_{FB}\right).$$

Note that this is done consistently with the relationship that links the delivered power to frequency in the resonant converter and the configuration of the feedback circuit. In fact, when the load demands less power, the output voltage tends to increase; the feedback loop reacts by reducing the control voltage Vc, which increases the OC current $I_{FB}$, and, therefore, the switching frequency as well, thus reducing the delivered power and counteracting the output voltage rise.

The timing components $R_1$, $R_2$ and $C_1$ define the oscillation frequency range of the CCO. In particular, $R_1$ sets the minimum operating frequency, which occurs when the current $I_{FB}$ is zero:

$$f_{sw\text{-}min} = f_{osc\text{-}min} = \frac{K_M Vr}{2\Delta V_{osc} R_1 C_1}.$$

$R_2$ along with $R_1$ sets the maximum operating frequency, that is, the frequency at which the device enters burst-mode operation, in which the device operates in short bursts, separated by idle periods. In fact, when $I_{FB}$ is such that the voltage on pin STBY, $V_{STBY}$, is lower than the threshold voltage $V_{th}$, the output of the comparator CO1 goes high and inhibits the oscillator and the pulse-train generator, causing both switches M1 and M2 to stay off. This frequency is given by:

$$f_{sw\text{-}max} = f_{osc\text{-}max} = \frac{K_M}{2\Delta V_{osc} C_1}\left(\frac{Vr}{R_1} + \frac{Vr - V_{th}}{R_2}\right).$$

Therefore, there is a discontinuity in the $f_{osc}$ vs. $I_{FB}$ relationship, so that its complete expression is:

$$f_{sw} = f_{osc} = \begin{cases} \frac{K_M}{2\Delta V_{osc} C_1}\left(\frac{Vr}{R_1} + I_{FB}\right) & \text{if } I_{FB} \leq \frac{Vr - V_{th}}{R_2} \\ 0 & \text{otherwise} \end{cases} \quad (1)$$

With the aid of FIG. 5 it is possible to explain burst-mode operation as follows.

When the load decreases (and the switching frequency rises) to the point that $V_{STBY}$ falls below the threshold $V_{th}$, the converter stops switching and the idle time begins. Since no more energy is delivered during the idle time, the load is supplied only by the filtering system (normally, the output capacitor bank Cout shown in FIG. 1, which here acts as energy reservoir as well) and the output voltage starts decaying. The feedback loop reacts to this by increasing the control voltage Vc, so $I_{FB}$ decreases and $V_{STBY}$ rises; as $V_{STBY}$ exceeds $V_{th}$ by a quantity equal to the hysteresis $V_H$ of the comparator CO1, the output thereof goes low thus re-enabling the oscillator and the pulse-train generator. M1 and M2 restart switching and the idle time ends. Due to this, the output voltage increases and, consequently, Vc decreases, $I_{FB}$ increases and $V_{STBY}$ decreases: as soon as it falls again below $V_{th}$ the converter stops switching again, and so on.

Note that the oscillator frequency at the beginning of a burst, $f_{osc.bb}$, is slightly lower than $f_{osc.max}$, in fact:

$$f_{osc\text{-}bb} = \frac{K_M}{2\Delta V_{osc} C_1}\left[\frac{Vr}{R_1} + \frac{Vr - (V_{th} + V_H)}{R_2}\right] = f_{osc\text{-}max} - \frac{K_M V_H}{2\Delta V_{osc} R_2 C_1}. \quad (2)$$

BRIEF SUMMARY

The performance of the above illustrated technique is rather good and the benefit in terms of efficiency improvement significant. However, the efficiency targets set by the upcoming regulations and recommendations concerning energy saving are becoming more and more demanding and it is tough to meet them even with resonant converters and their present day burst-mode control techniques. As a matter of fact, substantially all the control devices for resonant converters commercially available have a burst-mode operation that, apart from some minor details not concerning efficiency optimization, works in the way illustrated above.

There is a demand for a new and more efficient burst-mode technique that would make easier to meet these new challenging targets. Many studies on this topic are ongoing, a review of which is provided by the appended list of references.

In [1], a new technique is proposed where the "burst duty cycle", intended as the ratio of the duration of a burst to their repetition period, is changed depending on the output current Iout, while the switching frequency is kept constant within each burst. This technique cannot be easily used in systems where the control device is located on the primary side because the information coming from the output current sensing circuit has to cross the isolation boundary. Additionally, in [1] the usage of an MCU is proposed, which limits the applicability of the method to high-end systems where cost is not a prime concern.

In [2] a hysteretic (in the end, synonymous with burst-mode) control scheme is proposed where the converter always operates at the resonance frequency of the resonant tank and the low-side MOSFET M2 is kept always on during the idle time. This technique is simple but has the drawback of depleting the energy in the resonant tank completely. When a burst starts, the energetic state of the resonant tank has to be restored, similarly to a start-up condition but without high frequency operation that limits circulating currents. Big currents, large output voltage ripple and audible noise are expected.

In [3] a novel LLC burst mode control with a constant duration of the bursts and optimal switching pattern is proposed. The duration of bursts is constant, while the idle time is modulated by load conditions. In each burst, a three pulse switching pattern is implemented to keep output voltage low frequency ripple at a minimum. Also in this case the usage of an MCU is proposed, which brings the same limitations mentioned earlier.

In [4] a method is proposed in which the converter operates below the resonance frequency of the resonant tank during burst-mode, which seems to be quite a design limitation.

According to an embodiment described in the present disclosure a new and more efficient burst-mode technique is provided, as compared to those discussed above, that, on one hand, provides a substantially improved efficiency with limited drawbacks in terms of output voltage ripple increase and audible noise, and, on the other hand, lends itself to a relatively simple and low-cost circuit implementation.

According to another embodiment, a circuital implementation of the new and more efficient burst-mode method is disclosed, preferably to be realized in integrated form on a silicon chip. According to a further embodiment, a control device for resonant converters is disclosed, embedding the aforesaid circuit and a resonant converter controlled by the control device.

According to an embodiment, a method for controlling operation of a resonant converter is provided, including controlling a switching frequency of the converter, and thereby its power output, in direct relation to a feedback current, shifting the converter to an idle condition when the feedback current exceeds a first threshold, and introducing a nonlinearity into the relation of the switching frequency and the feedback current when the current exceeds a second threshold, lower than the first threshold.

According to another embodiment, a device for controlling a resonant converter is provided, that includes a current controlled oscillator having an input configured to receive a feedback control current from the controller and an output configured to provide a switching control signal for the converter, at a frequency that is related to a value of the feedback control signal current. The device also includes a burst mode control circuit configured to introduce a nonlinearity into the relation of the switching control signal frequency and the feedback control signal current while the control signal current is greater than a first threshold, and to shift the current controlled oscillator to an idle condition while the feedback control signal current is greater than a second threshold, higher than the first threshold.

According to an embodiment, the burst mode control circuit is configured the prevent the frequency of the switching control signal from increasing while the feedback control signal current is greater than the first threshold.

DETAILED DESCRIPTION

As mentioned earlier, the effectiveness of burst-mode operation in increasing light load efficiency stems from the reduction of the average switching frequency, which leads to a reduction of the switching losses associated to the parasitic elements in the converter and of the conduction losses associated to the reactive currents flowing in the resonant tank.

Therefore, to optimize efficiency during burst-mode operation, the power demanded by the load should be provided while minimizing the average switching frequency or, in other words, the number of switching cycles the converter performs per second. This can be achieved by maximizing the energy carried by the converter in each cycle, so as to reduce the number of cycles over time.

Figure 1:
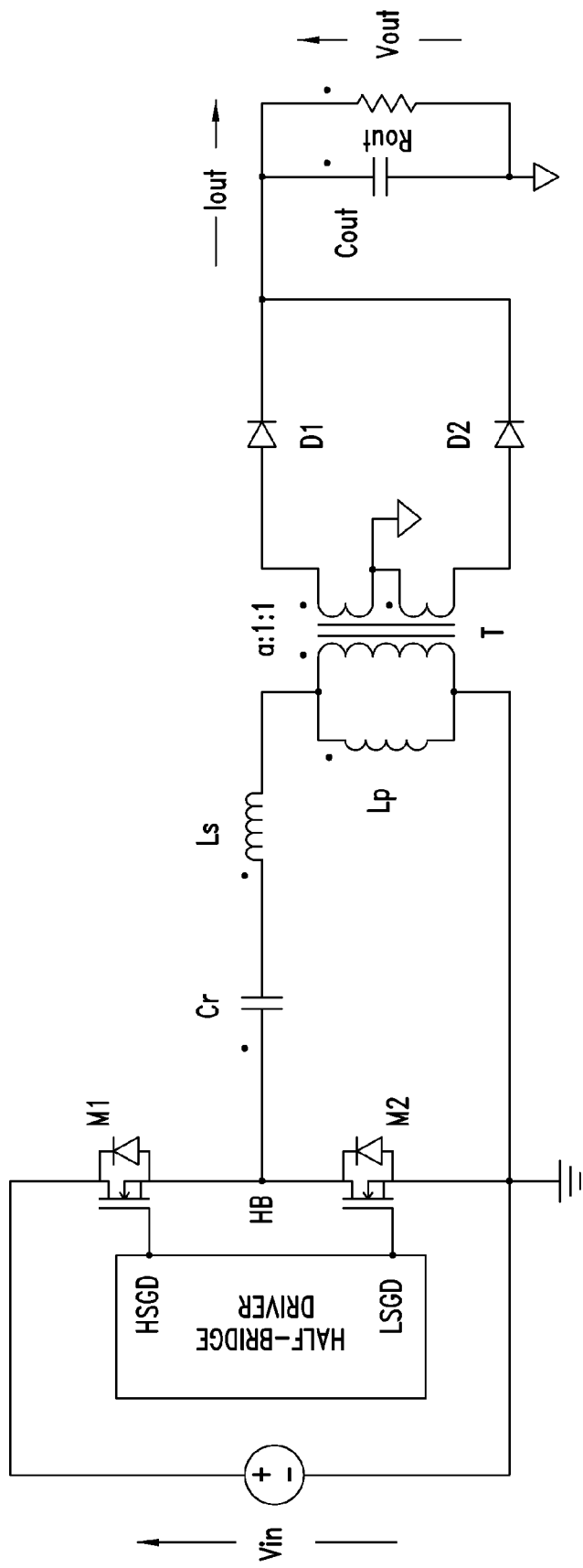
FIG. 1 shows a known LLC resonant half-bridge converter as an example of resonant dc-dc converters that can be rendered more efficient by the method of this disclosure.
Figure 2:
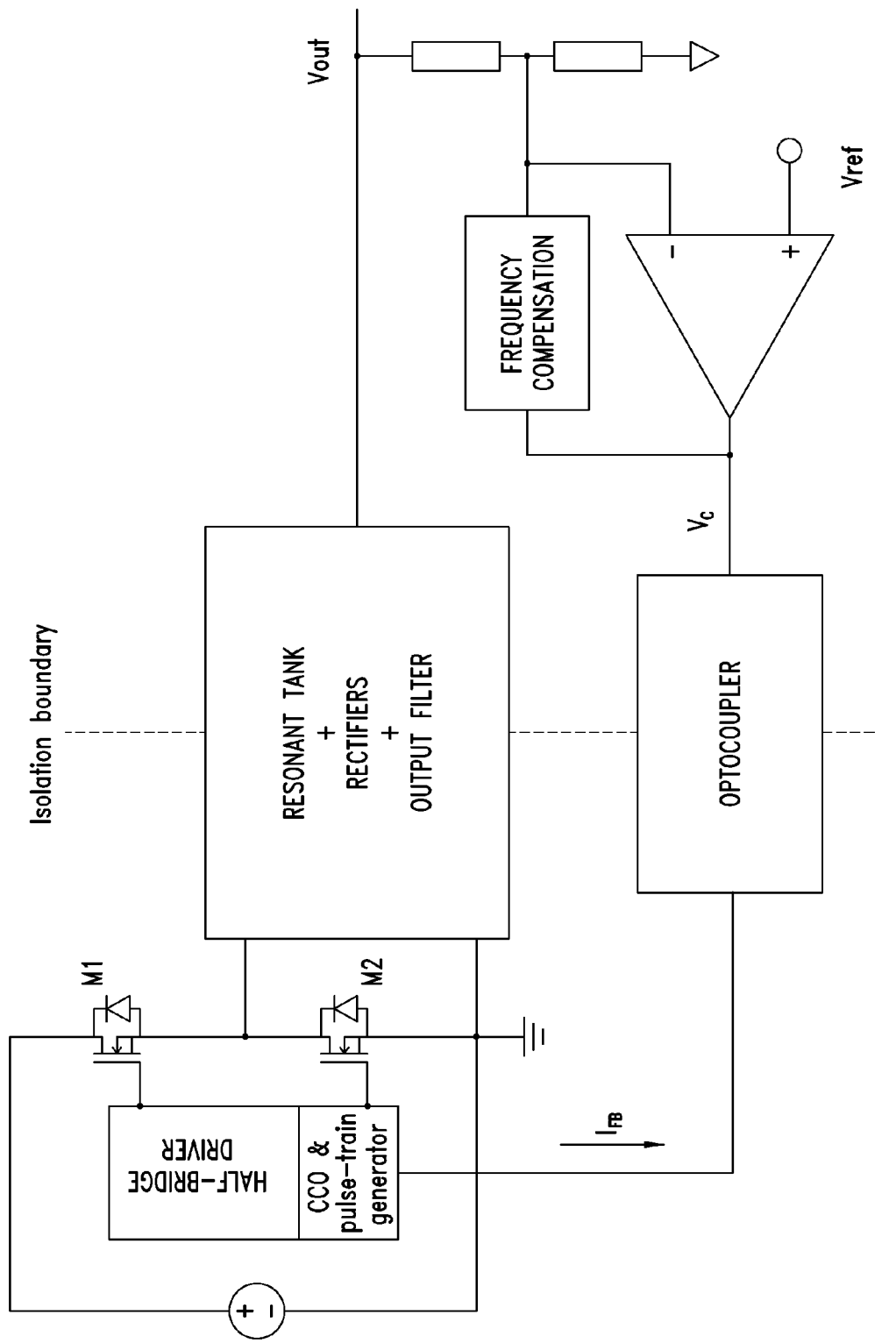
FIG. 2 shows a block diagram illustrating a typical known example of output voltage regulation control loop in a resonant dc-dc converter such as that described with reference to FIG. 1.
Figure 3:
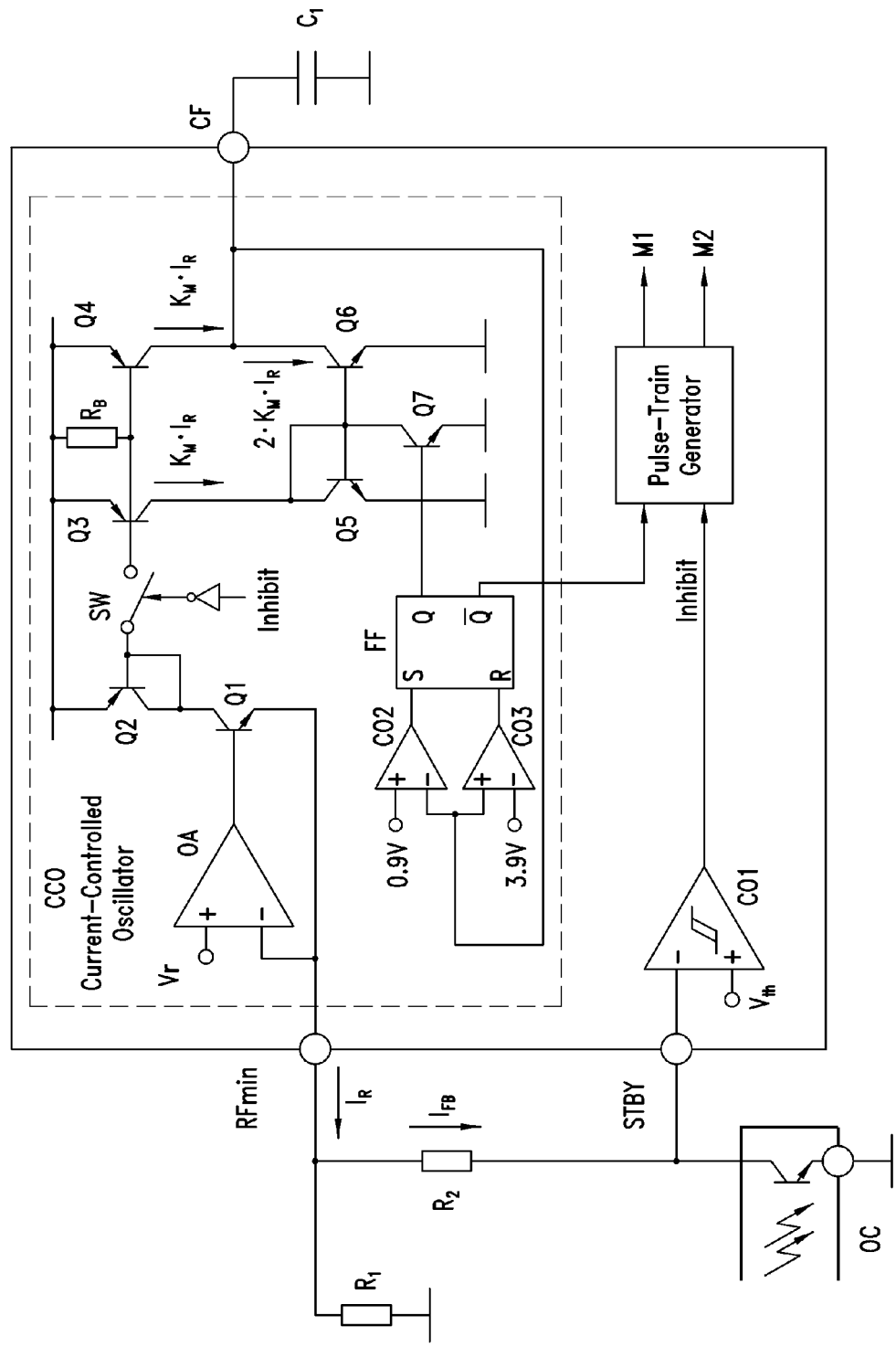
FIG. 3 shows the known current-controlled oscillator (CCO) in the commercial device L6599 from STMicroelectronics as well as the circuit that implements the burst-mode operation.
Figure 4:
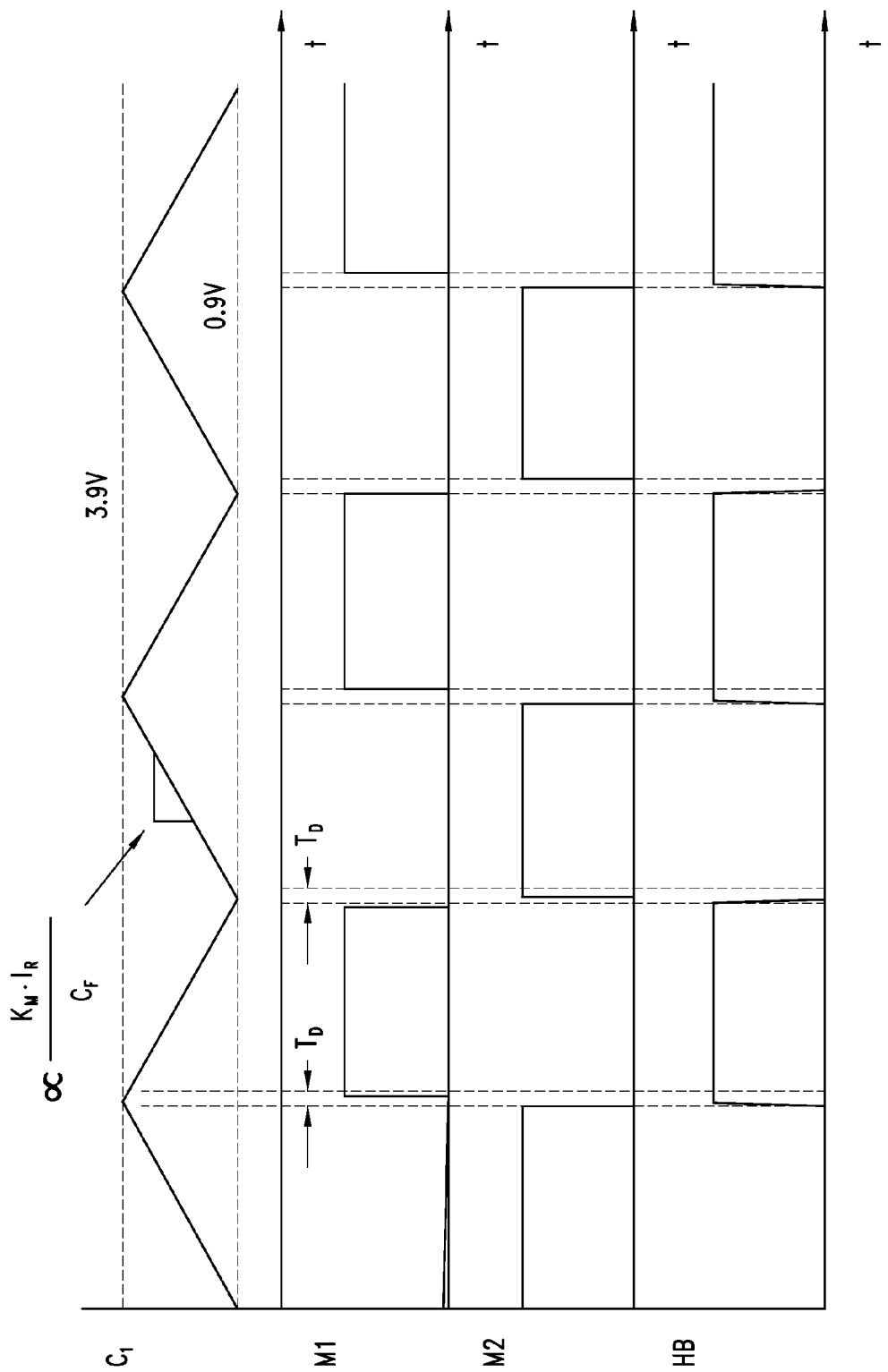
FIG. 4 shows the triangular wave generated by the CCO of FIG. 3, and its relationship with the gate-drive signals produced by the pulse-train generator.
Figure 5:
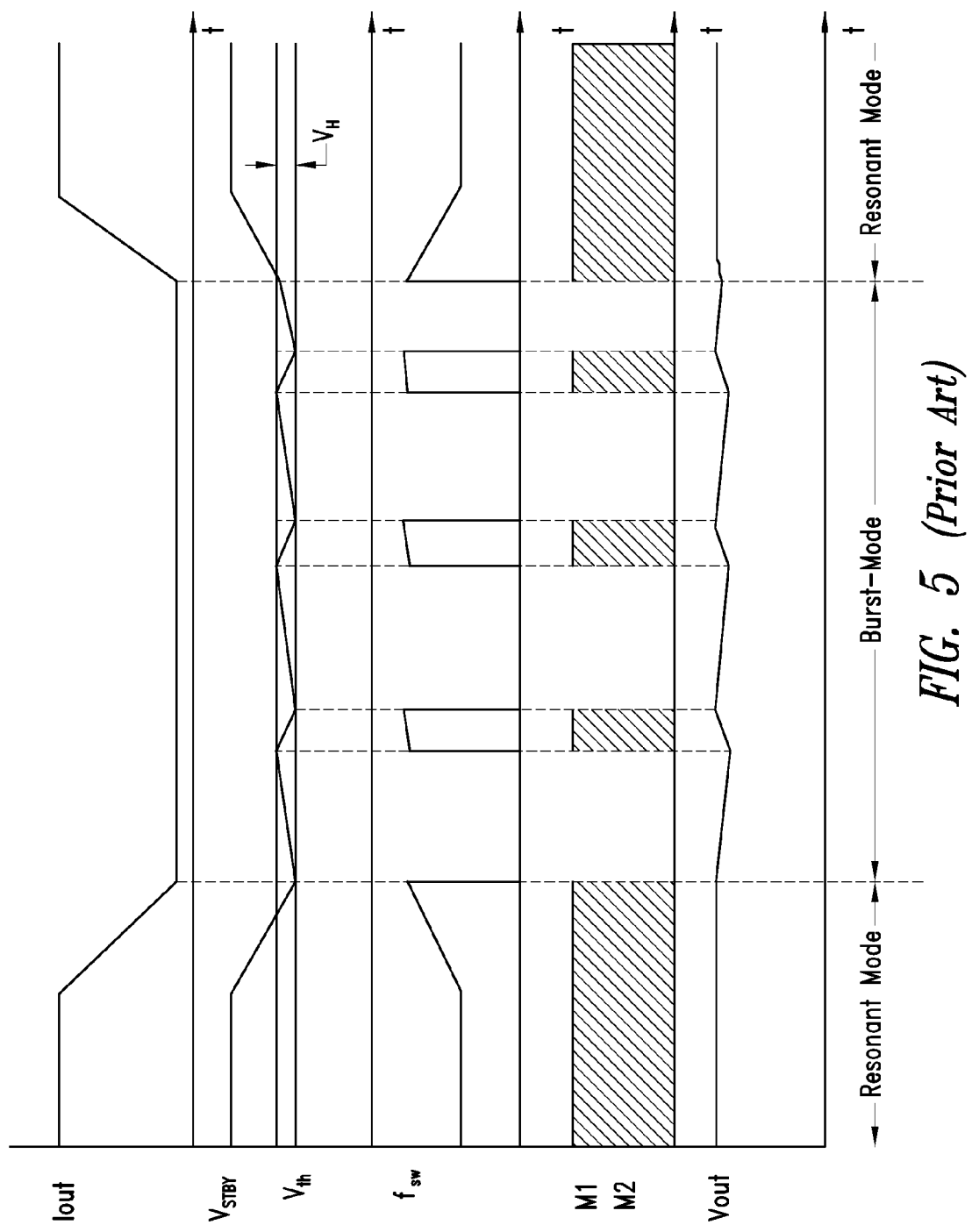
FIG. 5 shows the key waveforms that illustrate burst-mode operation of the CCO of FIG. 3, at light load.
Figure 6A:
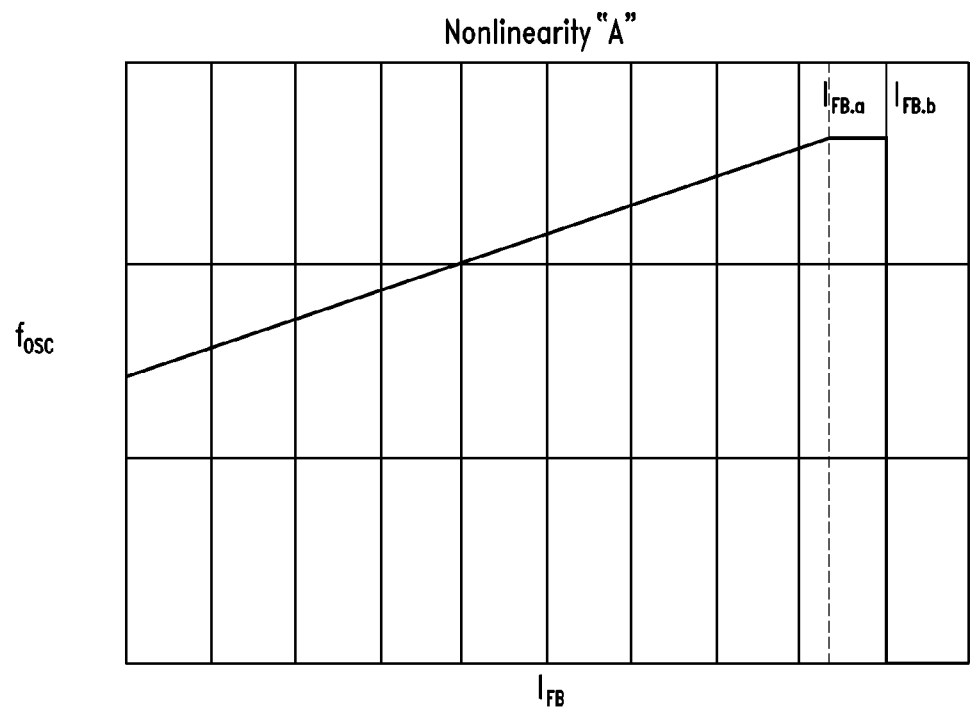
FIGS. 6A-E show five possible examples of nonlinearity ("A", "B", "C", "D", "E") in the $f_{osc}(I_{FB})$ function that, according to the applicant's findings, increase the energy transferred by a switching cycle of a resonant converter during burst-mode operation.
Figure 6B:
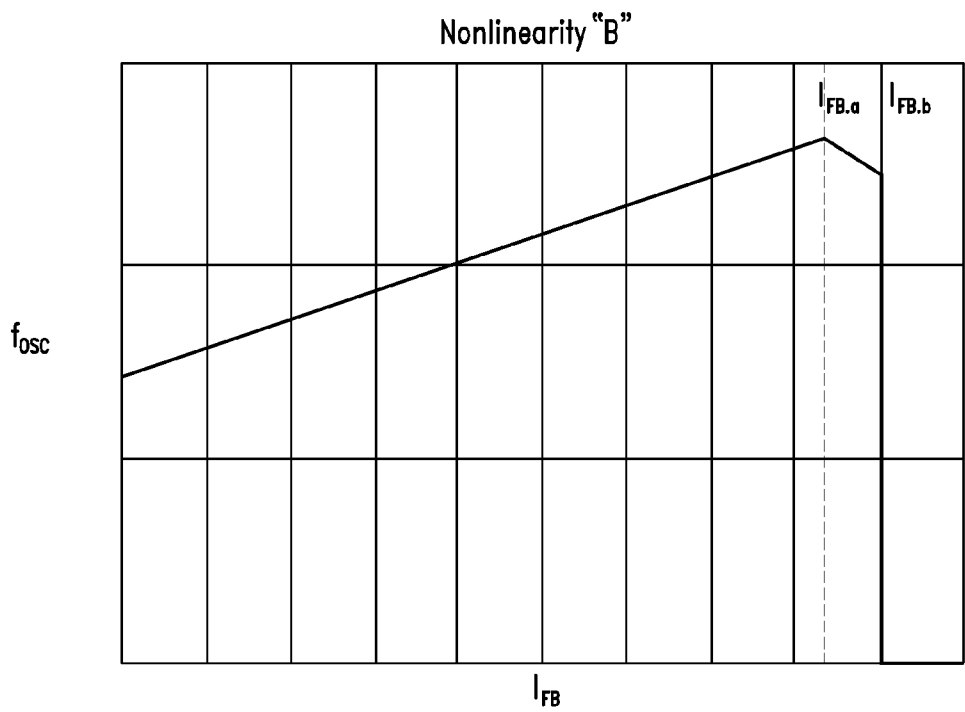
Figure 6C:
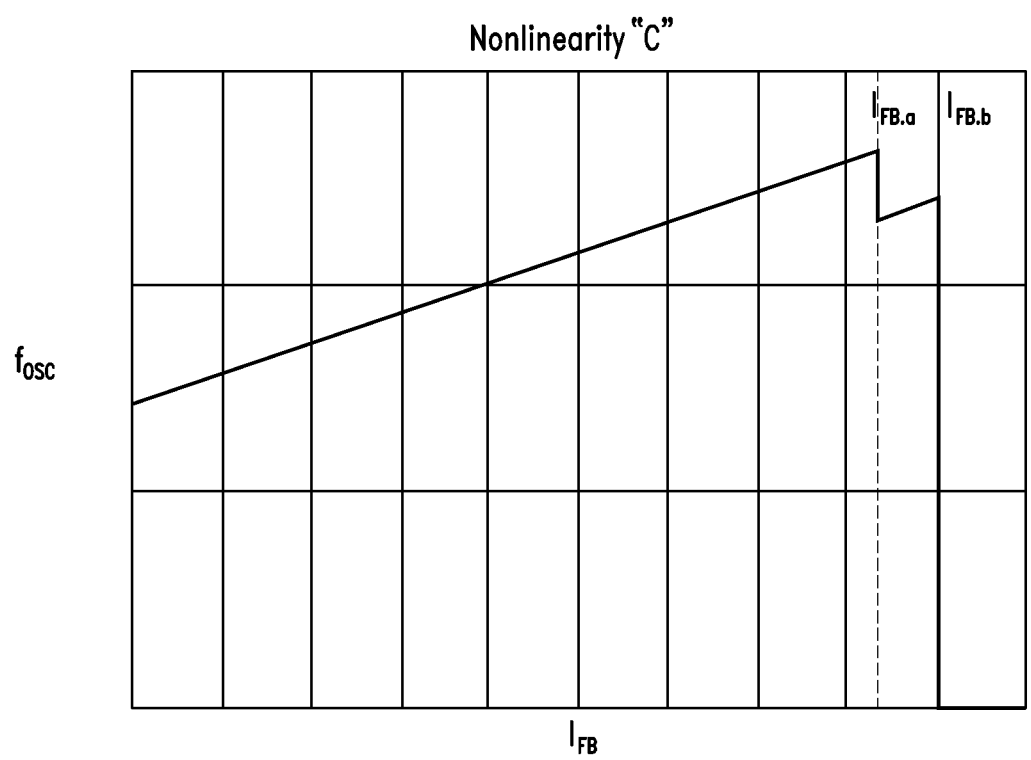
Figure 6D:
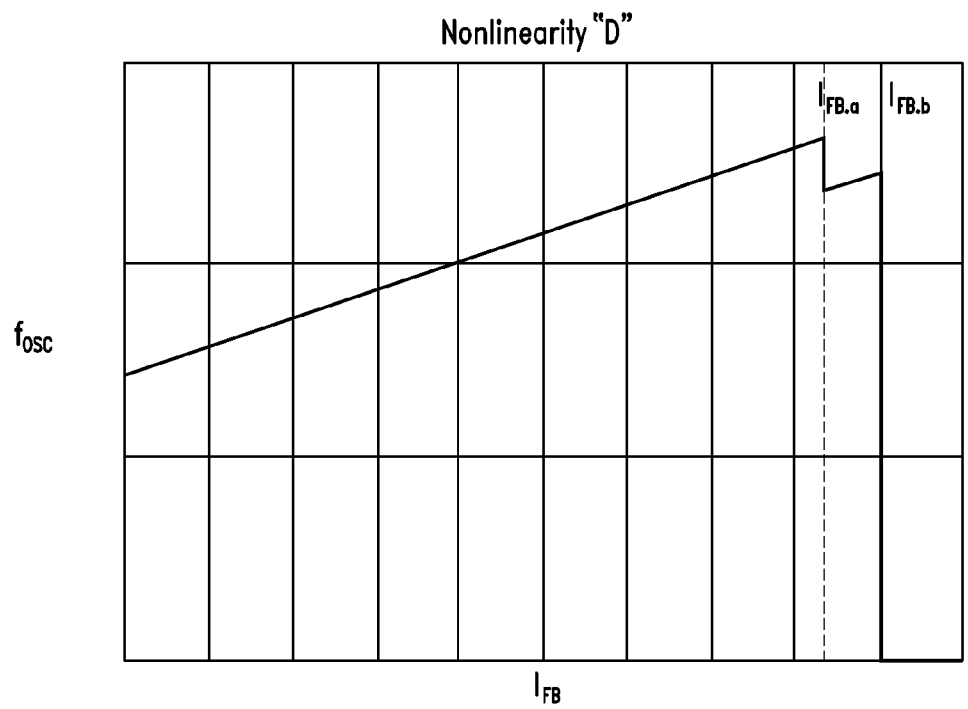
Figure 6E:
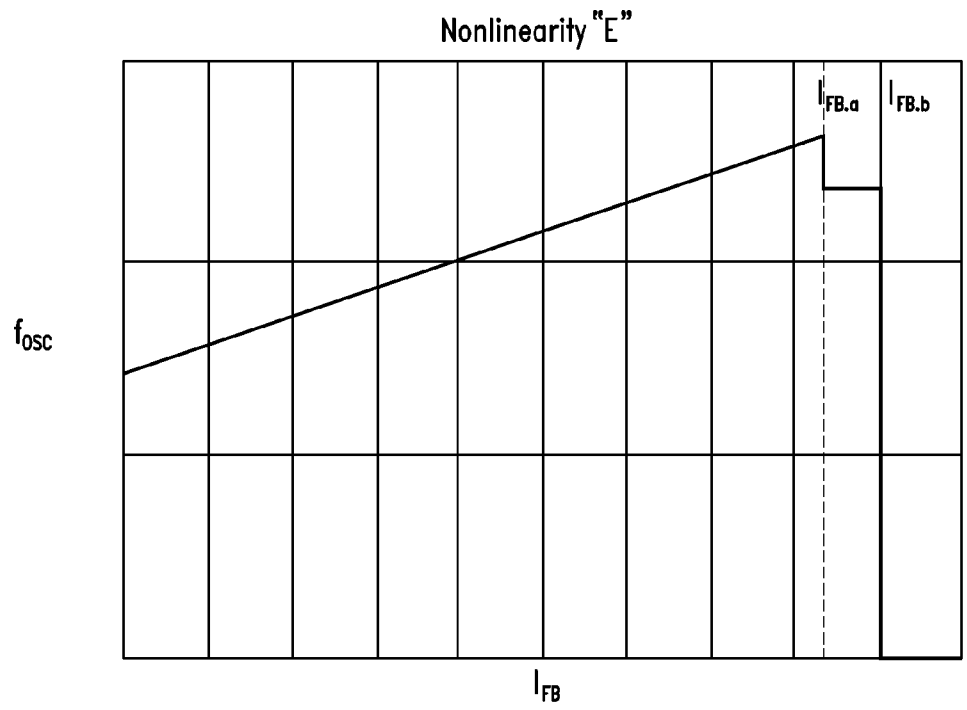

Since in a resonant converter the power it delivers increases when the switching frequency is reduced, the energy per cycle will increase if during burst-mode the converter is forced to switch at a lower frequency. Therefore, with reference to the schematic in FIG. 3, the principle behind embodiments described in the present disclosure is to introduce a nonlinearity in the $f_{osc}(I_{FB})$ function just prior to reaching the discontinuity at $I_{FB}=(Vr-V_{th})/R2$. To achieve a lower switching frequency this nonlinearity should originate an interval $(I_{FB}.a-I_{FB}.b)$ where either the function $f_{osc}(I_{FB})$ or its derivative $df_{osc}/dI_{FB}$ or both have a step discontinuity such that $f_{osc}(I_{FB}) \le f_{osc}(I_{FB}.a)$ for $I_{FB} \in (I_{FB}.a, I_{FB}.b)$. $I_{FB}.a$ represents the point on the $f_{osc}(I_{FB})$ characteristic at which the nonlinearity begins, and $I_{FB}.b$ is the point on $f_{osc}(I_{FB})$ at which the circuit stops switching and enters idle time mode. Between the two points, although the current $I_{FB}$ continues to rise, the switching frequency $f_{osc}$ does not, thus reducing the overall average switching frequency during burst mode operation.

When increasing the energy-per-cycle level in burst-mode, this can produce an increase of the ripple in the output voltage. A trade-off can be employed to increase the energy-per-cycle without unduly increasing the ripple.

An assumption that is done in the following discussion is that the current level $I_{FB}.bb=(Vr-V_{th}-V_H)/R2$ (refer to eq. (2)) at which the converter resumes switching is always $\ge I_{FB}.a$.

FIGS. 6A-6E show five possible examples of nonlinearity meeting the above assumption and that lend well themselves to a simple circuit implementation. Nonlinearities "A" and "B" keep $f_{osc}(I_{FB})$ continuous and have a discontinuity in the derivative; nonlinearity "C" introduces a discontinuity in $f_{osc}(I_{FB})$ only; nonlinearities "D" and "E" introduce a discontinuity both in $f_{osc}(I_{FB})$ and its derivative. Nonlinearities "C" and "D" look almost identical. However, after the discontinuity, with the former the slope of $f_{osc}(I_{FB})$ is unchanged, whereas with the latter the slope of $f_{osc}(I_{FB})$ changes too. For small amplitude of the discontinuities, which is what happen in practice, they are actually nearly indistinguishable.

In the following discussion some practical implementations of the nonlinearities of FIGS. 6A-E will be shown. They all refer to an exemplary current controlled oscillator (CCO) structure similar to that depicted in FIG. 3, including two current mirrors connected to a timing capacitor $C_1$ and wherein one or both mirrors are coupled, through other current mirrors in cascade, to a dedicated input pin of the oscillator in order to make possible that the charge and/or discharge current of the timing capacitor $C_1$ be proportional to a current $(I_r)$ sunk through said dedicated input pin.

Of course, similar types of functionality can be realized starting from different oscillator structures, with appropriate modifications that, in view of present disclosure, will be obvious to the skilled artisan.

Figure 7:
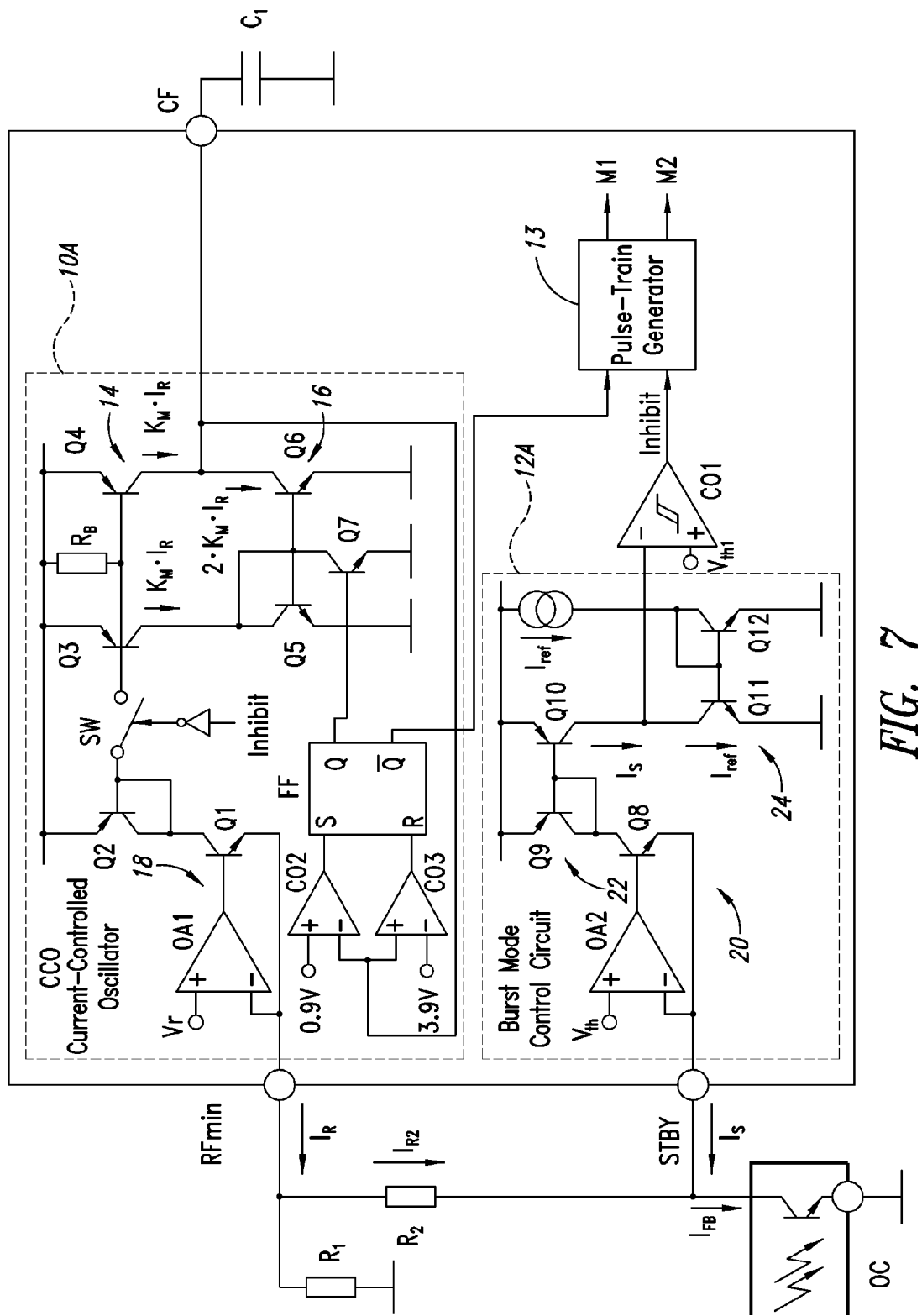
FIG. 7 shows an exemplary embodiment of a circuit that implements a nonlinearity of type "A" in the $f_{osc}(I_{FB})$ function.

The circuit shown in FIG. 7 is an example of implementation of the nonlinearity "A," employing a current controlled oscillator (CCO) 10A, a burst mode control circuit 12A, a comparator CO1, and a pulse-train generator 13 according to one embodiment. The CCO 10A includes a first current mirror 14, including transistors Q2, Q3, Q4, bias resistor $R_B$, and an inhibit switch SW; and a second current mirror 16, including transistors Q5, Q6, connected to a timing capacitor $C_1$.

The inhibit switch SW enables (when closed) the oscillator by connecting the first current mirror 14 to a first clamp circuit 18, including op-amp OA1 and transistor Q1, in order to make possible that the charge and/or discharge current of the timing capacitor $C_1$ be proportional to a current $(I_r)$ sunk through said dedicated input pin. Also connected to the input pin RFmin are resistors $R_1$, $R_2$ and the optocoupler OC. The CCO 10A also includes comparators CO2, CO3, a flip-flop FF, and a transistor Q7 coupled to the second current mirror 16.

The burst mode control circuit 12A includes a second clamp circuit 20 including an op-amp OA2 and a transistor Q8 coupled by another input pin STBY to the optocoupler OC; a current mirror 22 including transistors Q9, Q10; a current mirror 24 including transistors Q11, Q12; and a reference current source providing a reference current $I_{ref}$.

As long as $I_{FB}<I_{FB}.a$ (i.e., $V_{STBY}>V_{th}$), where $I_{FB}.a=(Vr-V_{th})/R2$, it is $I_{R2}=I_{FB}$ and $I_S=0$. When $I_{FB}$ equals $I_{FB}.a$ (i.e., when $V_{STBY}=V_{th}$), a second precision clamp circuit 20 made up of the op-amp OA2 and transistor Q8 is activated and prevents $V_{STBY}$ from further decreasing. Therefore, as the optocoupler OC sinks a current $I_{FB}>I_{FB}.a$ the current through $R_2$ remains fixed at $I_{FB}.a$, and the oscillator frequency at $f_{osc}(I_{FB}.a)$. The extra current $I_S=I_{FB}-I_{FB}.a$ is provided by the clamp circuit 20, in particular by Q8. This current is mirrored by transistors Q9, Q10 and compared to the reference current $I_{ref}$ mirrored by transistors Q11, Q12. As long as $I_S<I_{ref}$ the collector of Q11 is substantially at Vcesat and the output of the comparator CO1 is low. When $I_S$ becomes larger than $I_{ref}$, the Vce of Q11 goes up and as it exceeds $V_{th1}$ the output of CO1 goes high and inhibits the oscillator through the switch SW and the pulse-train generator 13. Note, incidentally, that $I_{FB}.b=I_{FB}.a+I_{ref}$. Note also that the CCO is exactly the same as that shown in FIG. 3.

Figure 8:
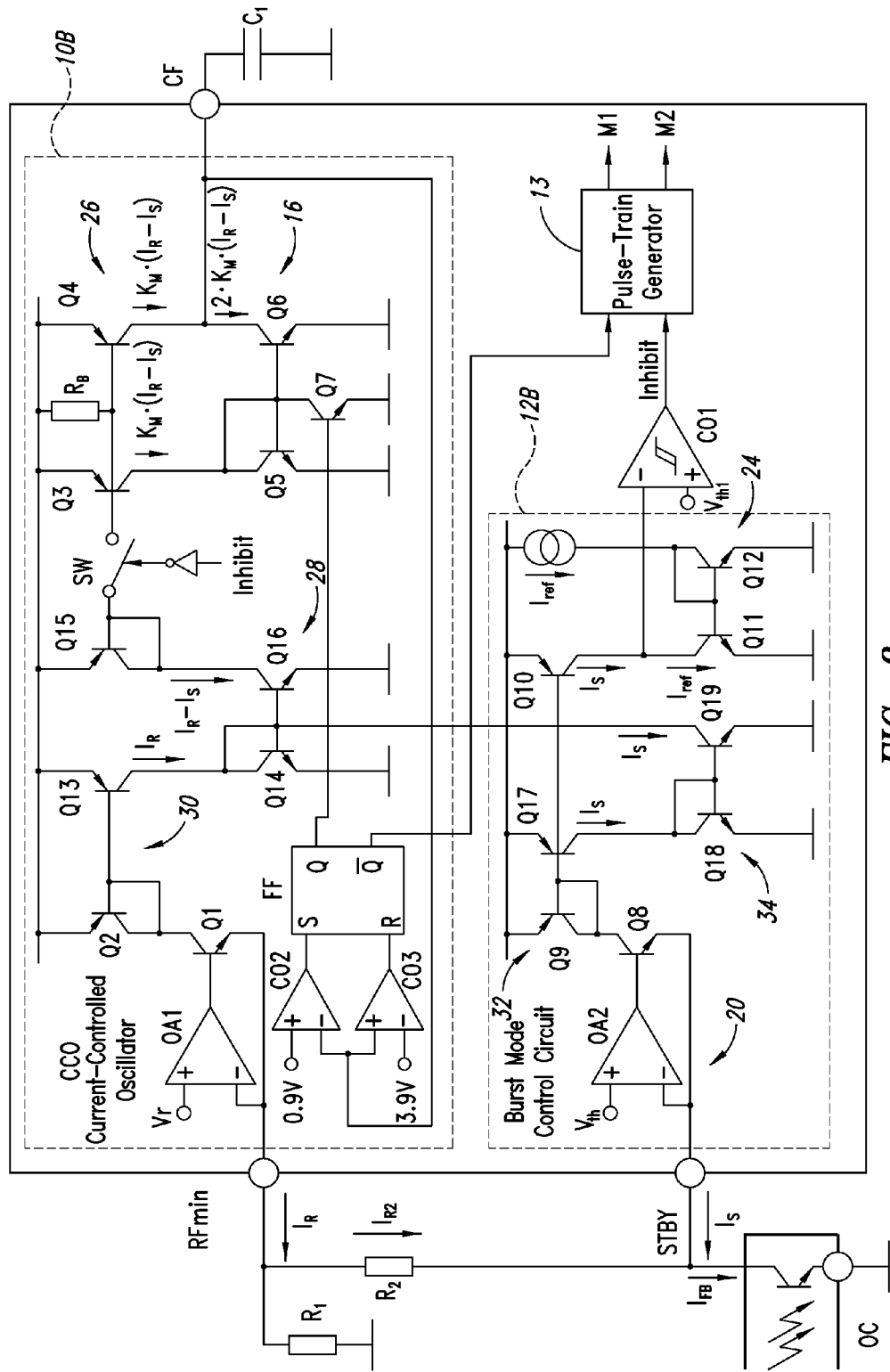
FIG. 8 shows an exemplary embodiment of a circuit that implements a nonlinearity of type "B" in the $f_{osc}(I_{FB})$ function.

The circuit shown in FIG. 8 is an example of implementation of the nonlinearity "B" employing a current controlled oscillator 10B and a burst mode control circuit 12B according to another embodiment. It can be thought as derived from the circuit in FIG. 7 with the addition of current mirrors 26, 28, 30 in the CCO 10B and current mirrors 32, 34 in the burst mode control circuit 12B. The current mirror 26 includes transistors Q3, Q4, Q15, bias resistor $R_B$, and inhibit switch SW, current mirror 28 includes transistors Q14, Q16, current mirror 30 includes transistors Q2, Q13, current mirror 32 includes transistors Q9, Q10, Q17, and current mirror 34 includes transistors Q18, Q19.

It works substantially in the same way as the circuit in FIG. 7, except that the mirror 34 subtracts the current $I_S$, sourced by Q8, from the current $I_R$ sourced by Q1 and going from Q13 to the mirror 28. Thus, this mirror and the subsequent mirrors 16, 26 in the chain, mirror $I_R-I_S$. As a result, the larger $I_S$, the smaller the current $KM \cdot (I_R-I_S)$ charging and discharging C1 and, therefore, the lower $f_{osc}(I_{FB})=f_{osc}(2I_{FB}.a-I_{FB})$.

$I_{FB}.a$ and $I_{FB}.b$ are the same as in the previous circuit. For simplicity, the mirrors 32, 34 work with a 1:1 mirroring ratio; with a different mirroring ratio it is possible to change the slope of the $f_{osc}(I_{FB})$ characteristic in the region $(I_{FB}.a, I_{FB}.b)$.

Figure 9:
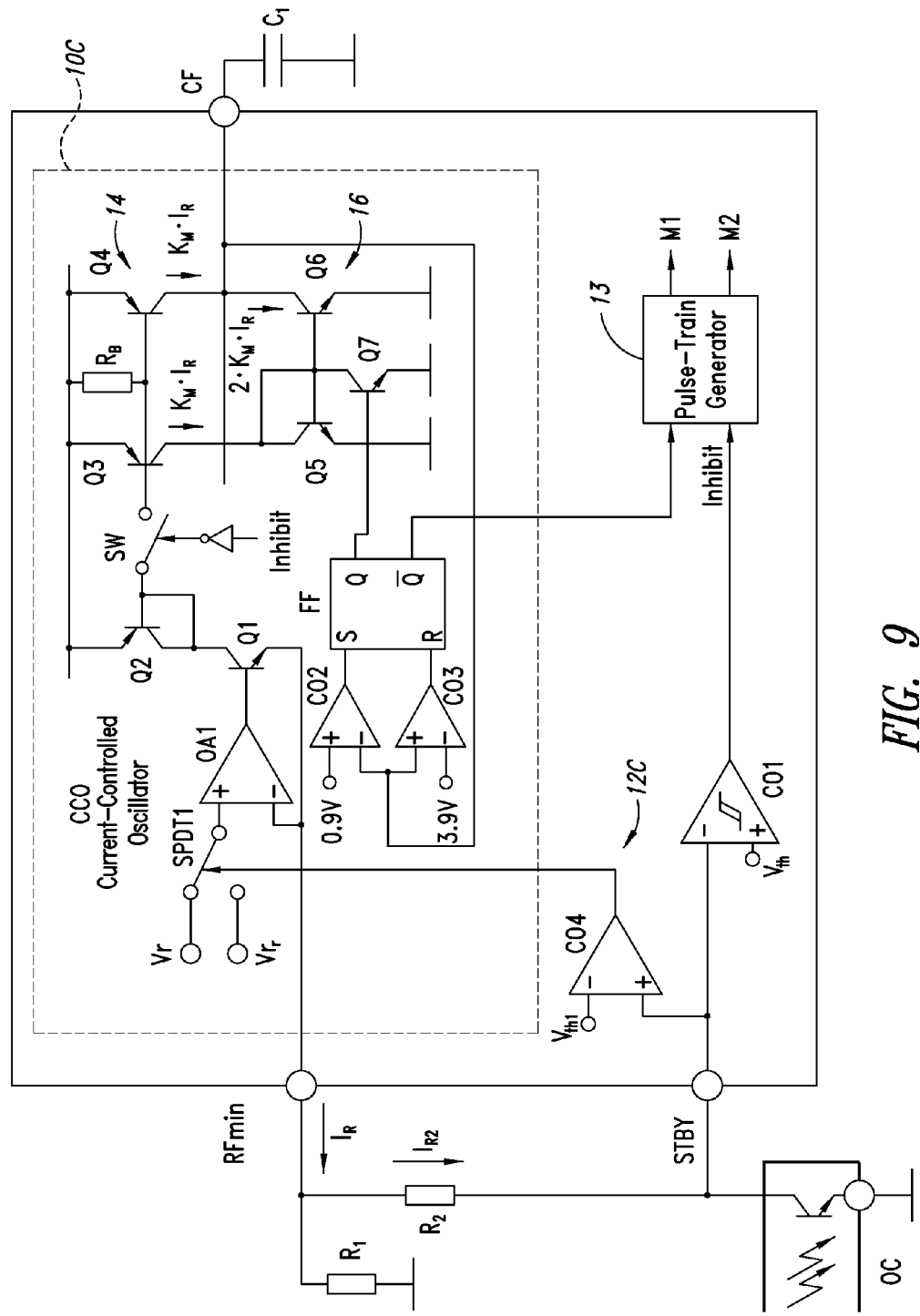
FIG. 9 shows an exemplary embodiment of a circuit that implements a nonlinearity of type "C" in the $f_{osc}(I_{FB})$ function.

The circuit of FIG. 9 is an exemplary implementation of the nonlinearity "C" including a CCO 10C and a burst mode control circuit 12C according to an embodiment. The CCO is the same as that shown in FIG. 3 except for the addition of a switch SPDT1 that is configured to switch the reference voltage on the non-inverting input of the op-amp OA1 between Vr and a second value $Vr_r<Vr$. The burst mode control circuit 12C includes a comparator CO4 having a non-inverting input coupled to the input pin STBY, an inverting input that receives the threshold voltage $V_{th1}$, and an output coupled to a control terminal of the switch SPDT1. Either reference voltage value is selected by the output of the comparator CO4: if the output is high (which occurs when $I_{FB}<I_{FB}.a$ i.e., $V_{STBY}>V_{th1}$, the single-pole double-throw switch SPDT1 connects the non-inverting input of op-amp OA1 to Vr, otherwise to $Vr_r$.

As $V_{STBY}=V_{th1}$ and the output of CO4 goes low, the resulting drop $\Delta Vr=Vr-Vr_r$ in the reference voltage for OA1 determines the same drop $\Delta Vr$ in the voltage appearing on the pin RFmin. As a consequence, also $V_{STBY}$ will drop by $\Delta Vr$ since $I_{FB}$ is unchanged. If $\Delta Vr \geq V_{th1}-V_{th}$, $V_{STBY}$ will immediately fall below $V_{th}$, which asserts the output of CO1 high, thus inhibiting the oscillator through the switch SW, and the pulse-train generator. In this case it is substantially $I_{FB}.a=I_{FB}.b=(Vr-V_{th1})/R2$. If, instead $\Delta Vr<V_{th1}-V_{th}$, the frequency drop resulting from $\Delta Vr$ voltage, equal to:

$$\Delta f_{osc} = \frac{K_M}{2\Delta V_{osc}C_1}\frac{\Delta Vr}{R_1}, \quad (3)$$

will force the feedback loop to react by increasing $I_{FB}$ to compensate for the sudden increase of energy delivery, so $V_{STBY}$ will quickly fall below $V_{th}(<V_{th1})$, thus triggering the same series of events as in the previous case. Note that the change $\Delta Vr$ does not modify the slope of the $f_{osc}(I_{FB})$ relationship.

In this case it is $I_{FB}.a=(Vr-V_{th1})/R2$, $I_{FB}.b=(Vr-V_{th})/R2$.

Figure 10:
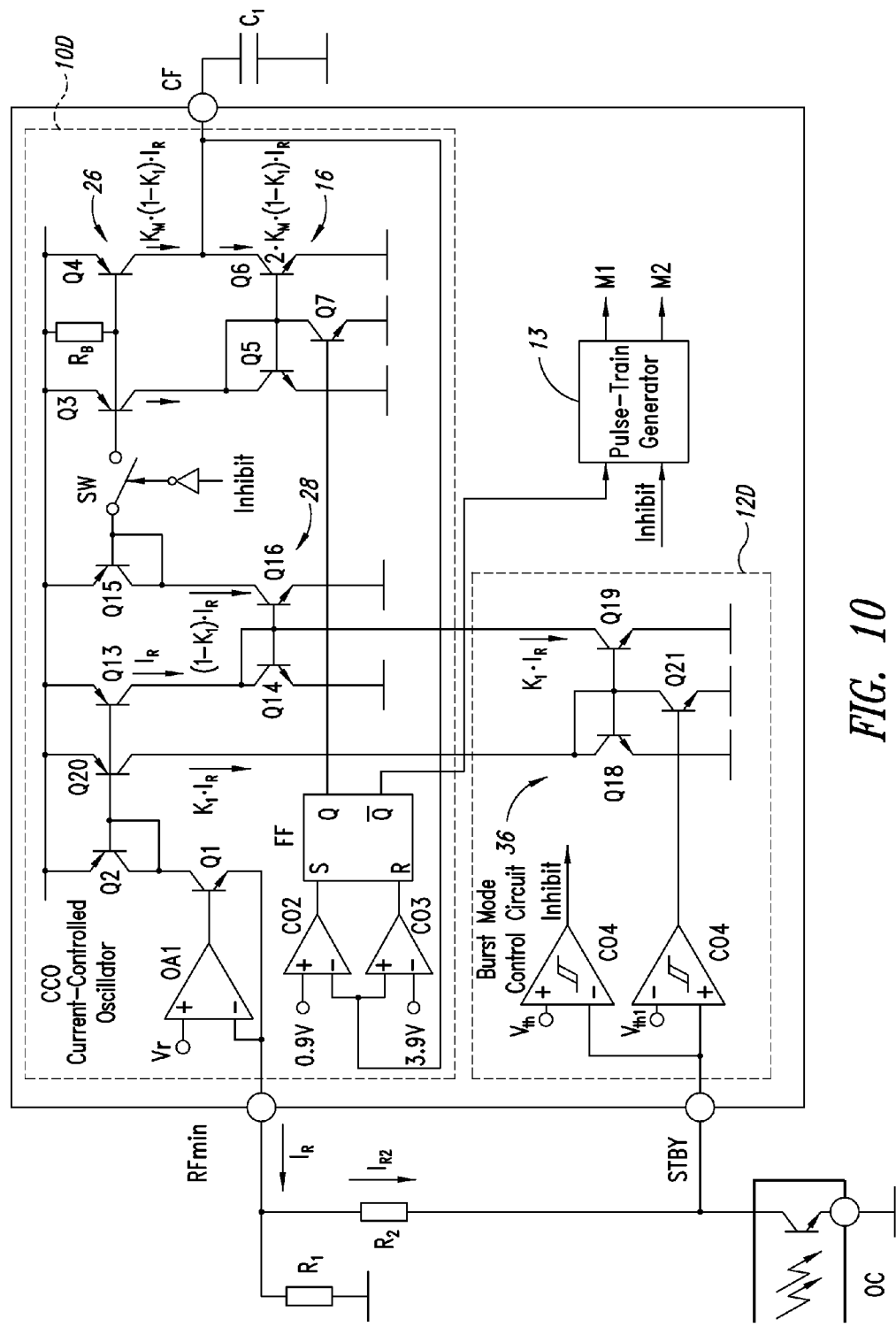
FIG. 10 shows a first exemplary embodiment of a circuit that implements a nonlinearity of type "D" in the $f_{osc}(I_{FB})$ function.

The circuit in FIG. 10 is a first exemplary circuit that implements the nonlinearity "D" employing a CCO 10D and a burst mode control circuit 12D according to an embodiment. The burst mode control circuit 12D includes a comparator CO4 having a non-inverting input coupled to the input pin STBY, an inverting input that receives the threshold voltage $V_{th1}$, and an output coupled to the base of a transistor Q21 coupled between the bases of transistors Q18, Q19 and ground. The comparator CO1 has its inverting and non-inverting inputs respectively coupled to the input pin STBY and the threshold voltage $V_{th}$ and its output coupled to the switch SW and the pulse-train generator 13. The CCO 10D has the same structure as that in the circuit in FIG. 8, with the addition of a transistor Q20 that mirrors a portion k1 (k1<1) of $I_R$ towards a current mirror 36, including transistors Q18, Q19, of the burst mode control circuit 12D. This subtracts the current $k1I_R$ from the current $I_R$ going from Q13 to the mirror 28. Thus, this mirror and the subsequent mirrors 14, 16, 26 in the chain, mirror $(1-k1)I_R$.

As long as $I_{FB}<I_{FB}.a$ (i.e., $V_{STBY}>V_{th1}$), the output of comparator CO4 is high, Q21 is on and the mirror 36 is disabled; the current flowing through the chain of mirrors 14, 16, 28 is IR and the charge/discharge current for C1 is KM·IR. As $V_{STBY}=V_{th1}$ the output of CO4 goes low, Q21 is switched off and the mirror 36 is activated; the current flowing through the chain of mirrors 14, 16, 28 jumps from IR to (1-k1)IR and the charge/discharge current for C1 to KM·(1-k1)IR.

The resulting frequency decrease will force the feedback loop to react by increasing $I_{FB}$ to compensate for the sudden increase of energy delivery, so $V_{STBY}$ will quickly fall below $V_{th}(<V_{th1})$, will assert the output of CO1 high, thus inhibiting the oscillator through the switch SW and the pulse-train generator 13.

Also in this circuit it is $I_{FB}.a=(Vr-V_{th1})/R2$, $I_{FB}.b=(Vr-V_{th})/R2$.

Figure 11:
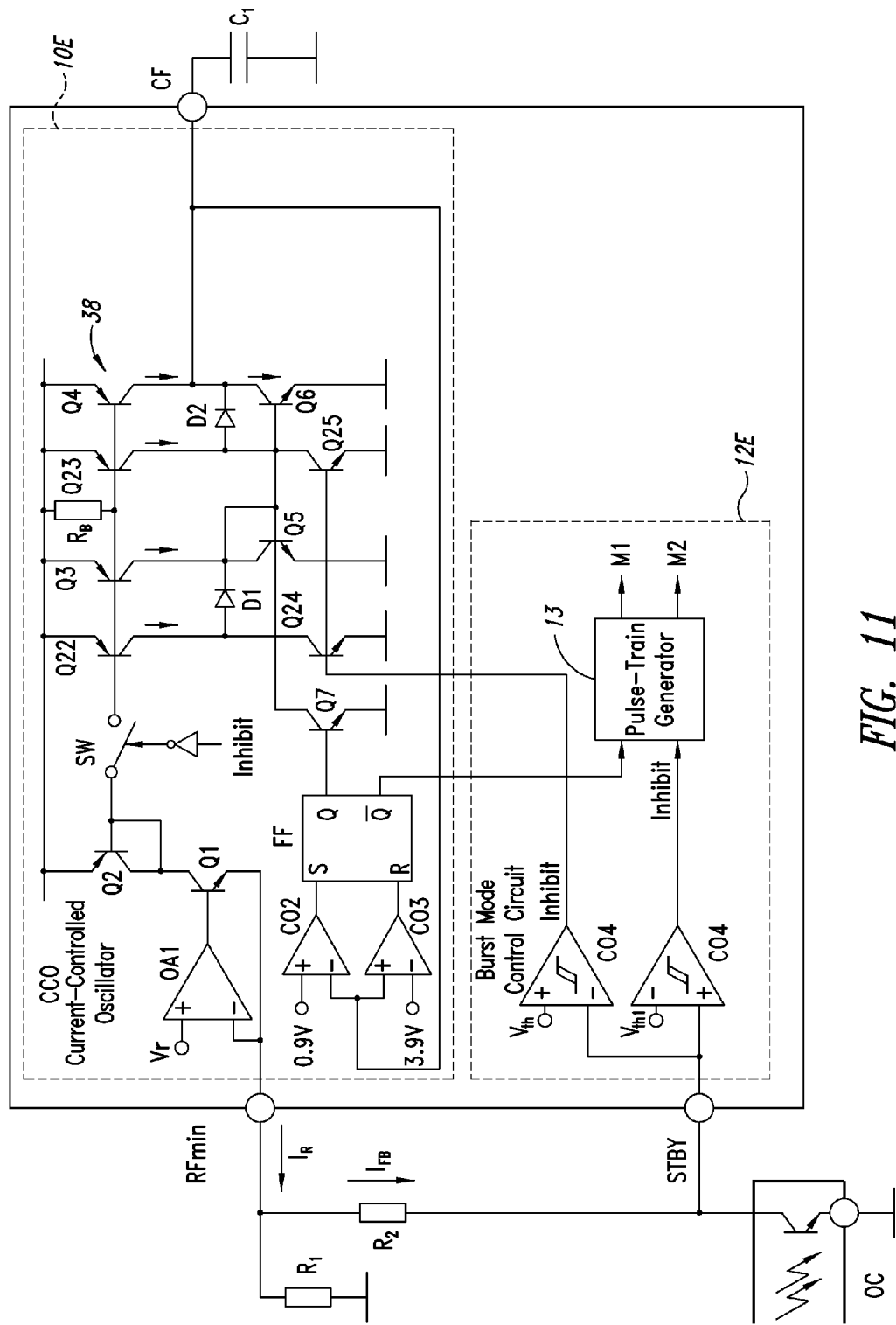
FIG. 11 shows a second exemplary embodiment of a circuit that implements a nonlinearity of type "D" in the $f_{osc}(I_{FB})$ function.

The circuit in FIG. 11 is a second exemplary circuit that implements the nonlinearity "D," and includes a CCO 10E and a burst mode control circuit 12E according to another embodiment. The CCO 10E includes a current mirror 38; including transistors Q2, Q3, Q4, Q22, Q23 and inhibit switch SW; transistor Q24 coupled between Q22 and ground; transistor Q25 coupled between Q23 and ground; a first diode D1 coupled between the emitters of Q22 and Q3; and a second diode D2 coupled between the emitters of Q23 and Q4. In this case the current mirror 38, which charges and discharges C1, is split in two modules: Q23+Q4 (charge), Q22+Q3 (discharge via Q5, Q6). Transistors Q23 and Q22 mirror a portion k1 (k1<1) of IR, Q4 and Q3 mirror the remaining portion (1-k1) of IR.

As long as $V_{STBY}>V_{th1}$, the output of comparator CO4 is low, Q24 and Q25 are off, thus Q22 and Q23 deliver their collector current to the mirror Q5, Q6 via diode D1 and to capacitor C1 via diode D2, respectively. Therefore, the charge/discharge current for C1 is KM·IR. As $V_{STBY}=V_{th1}$ the output of CO4 goes high, Q24 and Q25 are turned on, thus the collector current k1IR of both Q22 and Q23 is diverted to ground. The diodes D1 and D2 isolate Q24 and Q25 so that the oscillator operation is unaffected except for the charge/discharge current for C1 that jumps to KM·(1-k1)IR.

Also in this case, the resulting frequency decrease forces the feedback loop to react by increasing $I_{FB}$ to compensate for the sudden increase of energy delivery, so $V_{STBY}$ quickly falls below $V_{th}(<V_{th1})$, which asserts the output of comparator CO1 high, thus inhibiting the oscillator through the switch SW and the pulse-train generator 13.

$I_{FB}.a$ and $I_{FB}.b$ are the same as in the previous circuit.

Figure 12:
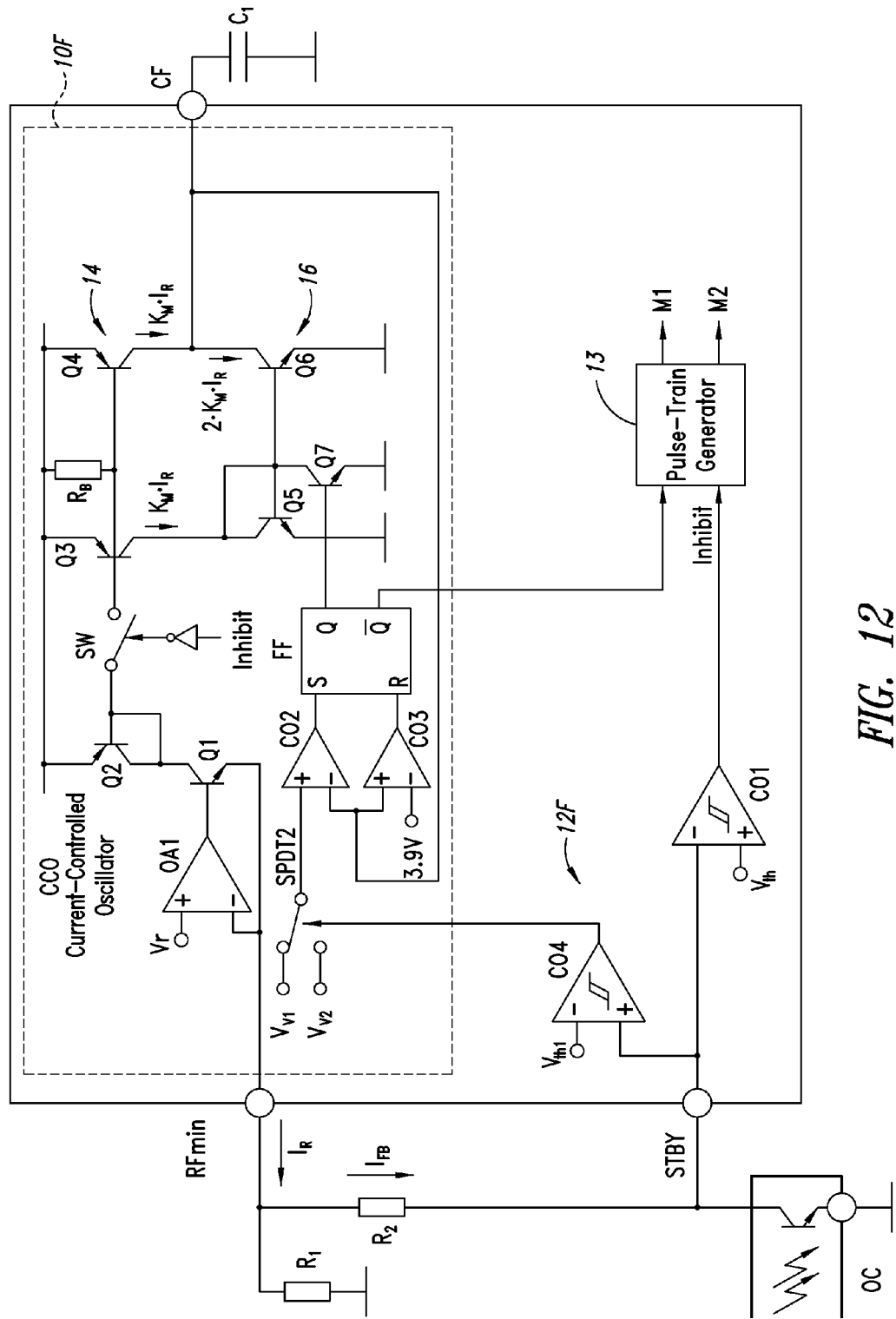
FIG. 12 shows a third exemplary embodiment of a circuit that implements a nonlinearity of type "D" in the $f_{osc}(I_{FB})$ function.

The circuit in FIG. 12 is a third exemplary circuit that implements the nonlinearity "D," and includes a CCO 10F and a burst mode control circuit 12F according to a further embodiment.

The burst mode control circuit 12F is the same as the burst mode control circuit 12B of FIG. 9. The CCO 10F is the same as that shown in FIG. 3 except for the addition of a single-pole double-throw switch SPDT2 that is configured to switch the reference voltage on the non-inverting input of the comparator CO2 between a first value $V_{V1}$ and a second value $V_{V2}<V_{V1}$. Either value is selected by the output of the comparator CO4: if the output is high (which occurs when $V_{STBY}>V_{th1}$), the single-pole double-throw switch SPDT2 connects the non-inverting input to $V_{V1}$, otherwise to $V_{V2}$. Note that $V_{V1}$ corresponds to the 0.9 V reference voltage shown in the schematics in FIGS. 7 to 11.

As long as $V_{STBY}>V_{th1}$, the output of CO4 is high and the oscillator swing is $\Delta Vosc=3.9-V_{V1}$. As $V_{STBY}=V_{th1}$ and the output of CO4 goes low, the peak-to-valley swing $\Delta Vosc$ will increase by the difference $V_{V1}-V_{V2}$, thus originating a step reduction both in $f_{osc}(I_{FB})$ and in the slope of $f_{osc}(I_{FB})$ (refer to eq. 1), like the first two exemplary circuits. This frequency drop will force the feedback loop to react by increasing $I_{FB}$ to compensate for the sudden increase of energy delivery, so $V_{STBY}$ will quickly fall below $V_{th}(<V_{th1})$, the output of CO1 will be asserted high, thus inhibiting the oscillator through the switch SW, and the pulse-train generator.

$I_{FB}.a$ and $I_{FB}.b$ are still the same.

Obviously, the very same functionality can be obtained by changing the reference voltage for comparator CO3 from a first value Vp1 (=3.9 V) to a second value Vp2>Vp1.

Figure 13:
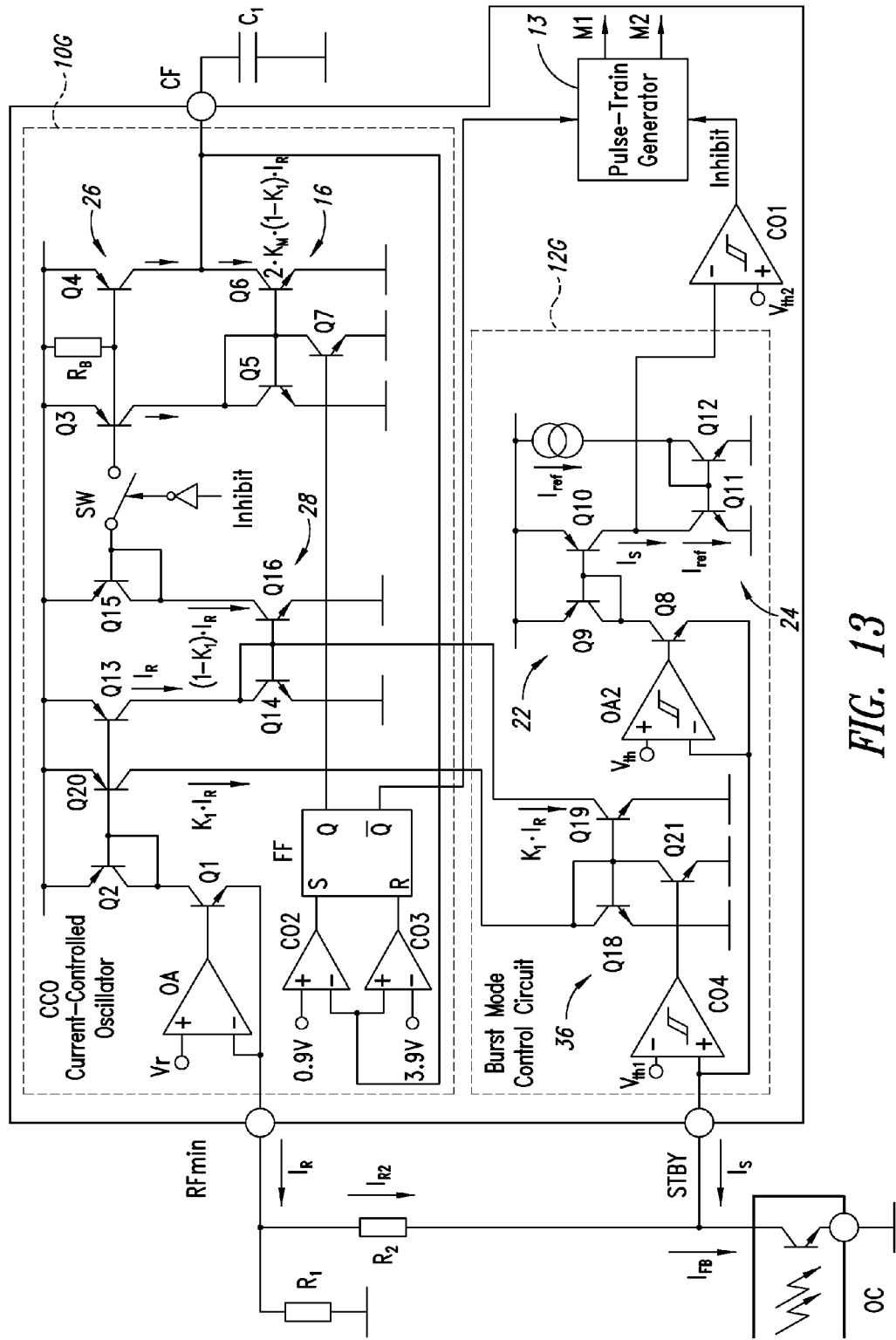
FIG. 13 shows a first exemplary embodiment of a circuit that implements a nonlinearity of type "E" in the $f_{osc}(I_{FB})$ function.

It is worth noticing that the nonlinearity "E" can be thought as the combination of nonlinearity "D" and nonlinearity "A". As such, one embodiment of its implementation can be the combination of the circuit in FIG. 7 and the circuit in FIG. 10. This is shown in the exemplary circuit in FIG. 13, which includes a CCO 10G and a burst mode control circuit 12G.

As long as $I_{FB}<I_{FB}.a$ (i.e., $V_{STBY}>V_{th}$), where $I_{FB}.a=(Vr-V_{th1})/R2$, it is $I_{R2}=I_{FB}$ and $I_S=0$. The output of CO4 is high, Q21 is on and the mirror 36 is off; the current flowing through the chain of mirrors 16, 26, 28 is IR and the charge/discharge current for C1 is KM·IR. As $V_{STBY}=V_{th1}$ the output of CO4 goes low, Q21 is switched off and the mirror 36 is activated; the current flowing through the chain of mirrors 16, 26, 28 jumps from IR to (1−k1)IR and the charge/discharge current for C1 to KM·(1−k1)IR.

The resulting frequency decrease will force the feedback loop to react by increasing $I_{FB}$ to compensate for the sudden increase of energy delivery, so $V_{STBY}$ will quickly fall and reach $V_{th}$ ($<V_{th1}$). The precision clamp made up of the op-amp OA2 and Q8 is activated and prevents $V_{STBY}$ from further decreasing. Therefore, as the optocoupler sinks a current $I_{FB}>(Vr−V_{th})/R2$, $I_{R2}$ is constant, and so is the oscillator frequency. The extra current $I_S$ is provided by Q8. This current is mirrored by current mirror 22 and compared to the reference current $I_{ref}$ mirrored by mirror 24. As long as $I_S<I_{ref}$ the collector of Q11 is substantially at Vcesat and the output of the comparator CO1 is low. When $I_S$ becomes larger than $I_{ref}$, the Vce of Q11 goes up and as it exceeds Vth2 the output of CO1 goes high and inhibits the oscillator through the switch SW and the pulse-train generator 13.

In this circuit it is: $I_{FB}.a=(Vr−V_{th1})/R2$, $I_{FB}.b=(Vr−V_{th})/R2+I_{ref}$.

Figure 14:
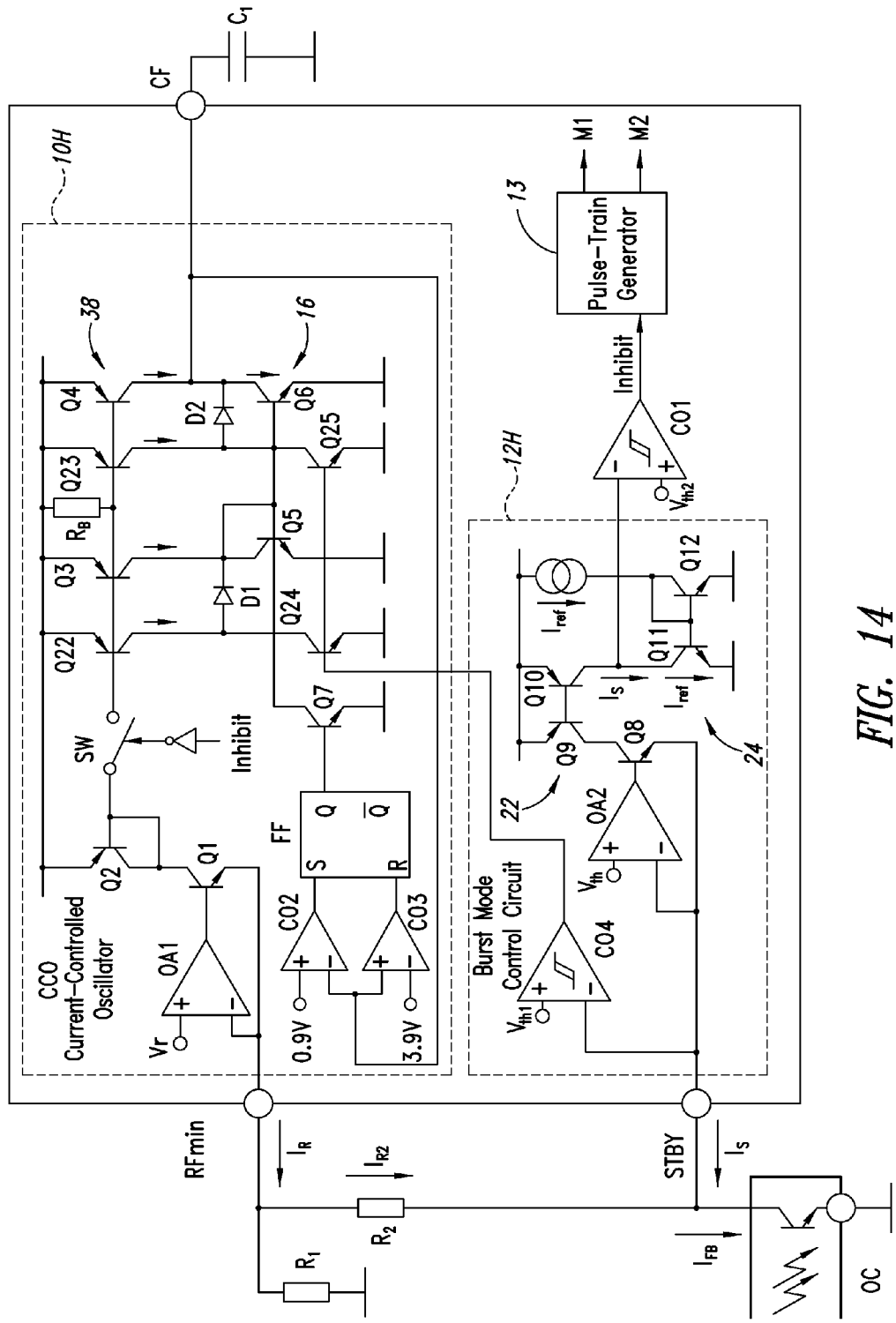
FIG. 14 shows a second exemplary embodiment of a circuit that implements a nonlinearity of type "E" in the $f_{osc}(I_{FB})$ function.

According to an alternative embodiment, the implementation of nonlinearity "E" can be the combination of the circuit in FIG. 7 and the circuit in FIG. 11. This is shown in the circuit in FIG. 14, which includes a CCO 10H and a burst mode control circuit 12H.

As long as $I_{FB}<I_{FB}.a$ (i.e., $V_{STBY}>V_{th}$), where $I_{FB}.a=(Vr−V_{th1})/R2$, it is $I_{R2}=I_{FB}$ and $I_S=0$. The output of CO4 is low, Q24 and Q25 are off, thus Q22 and Q23 deliver their collector currents to the mirror Q5, Q6 via D1 and to C1 via D2, respectively. Therefore, the charge/discharge current for C1 is KM·IR. As $V_{STBY}=V_{th1}$ the output of CO4 goes high, Q24, Q25 are turned on, thus the collector current k1IR of both Q22 and Q23 is diverted to ground. The diodes D1 and D2 isolate Q24 and Q25 so that the oscillator operation is unaffected except for the charge/discharge current for C1 that jumps to KM·(1−k1)IR.

Again, the resulting frequency decrease will force the feedback loop to react by increasing $I_{FB}$ to compensate for the sudden increase of energy delivery, so $V_{STBY}$ will quickly fall down to $V_{th}$ ($<V_{th1}$). The precision clamp made up of the op-amp OA2 and Q8 is activated and prevents $V_{STBY}$ from further decreasing. Therefore, as the optocoupler sinks a current $I_{FB}>(Vr−V_{th})/R2$, $I_{R2}$ is constant, and so is the oscillator frequency. The extra current $I_S$ is provided by Q8. This current is mirrored by Q13, Q14 and compared to the reference current $I_{ref}$ mirrored by Q9, Q10. As long as $I_S<I_{ref}$ the collector of Q11 is substantially at Vcesat and the output of the comparator CO1 is low. When $I_S$ becomes larger than $I_{ref}$, the Vce of Q11 goes up and as it exceeds $V_{th2}$ the output of CO1 goes high and inhibits the oscillator through the switch SW and the pulse-train generator 13.

In this circuit it is: $I_{FB}.a=(Vr−V_{th1})/R2$, $I_{FB}.b=(Vr−V_{th})/R2+I_{ref}$.

Figure 15:
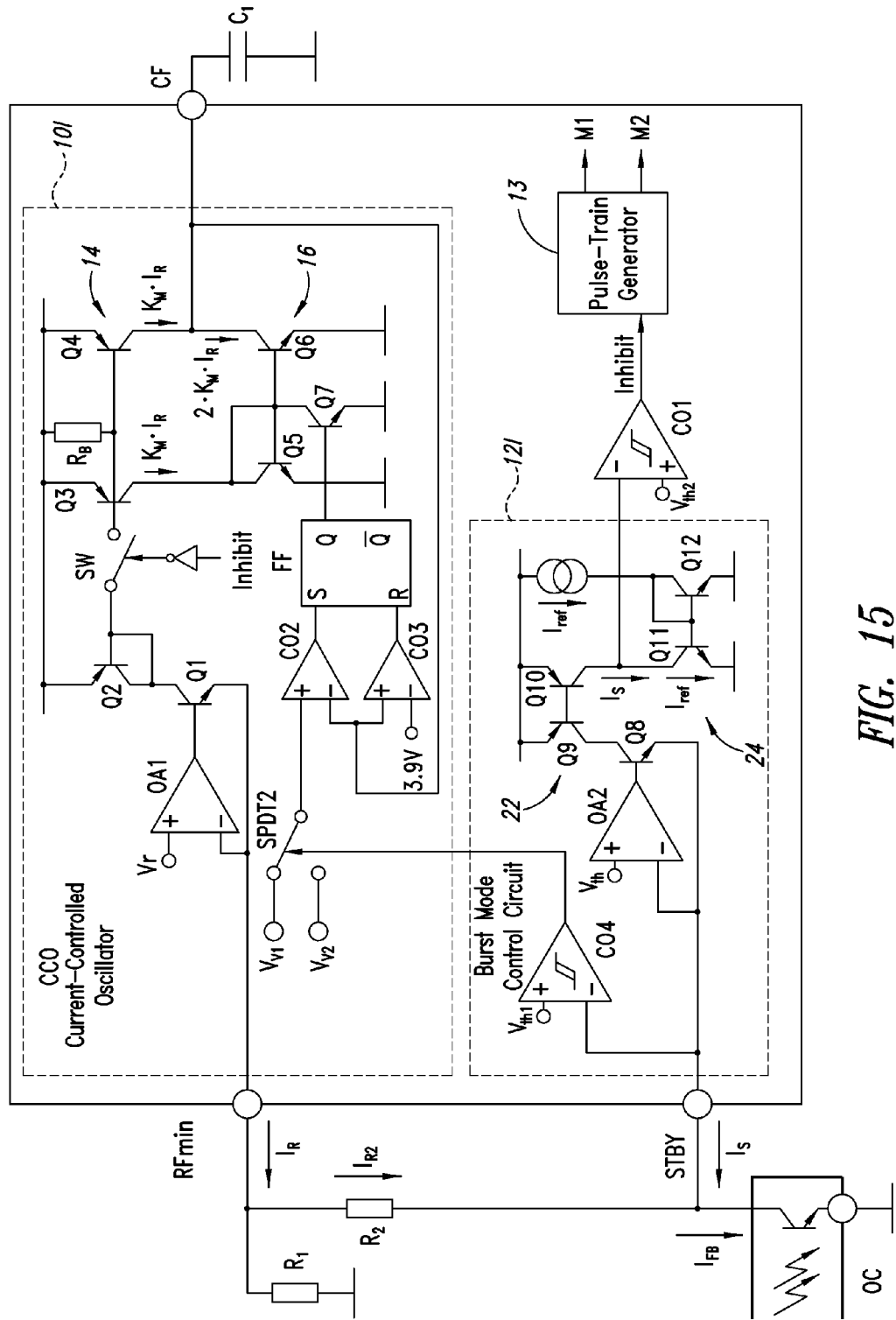
FIG. 15 shows a third exemplary embodiment of a circuit that implements a nonlinearity of type "E" in the $f_{osc}(I_{FB})$ function.

Finally, according to an embodiment, the implementation of nonlinearity "E" can be the combination of the circuit in FIG. 7 and the circuit in FIG. 12. This is shown in the circuit in FIG. 15, which includes a CCO 10I and a burst mode control circuit 12I.

As long as $I_{FB}<I_{FB}.a$ (i.e., $V_{STBY}>V_{th}$), where $I_{FB}.a=(Vr−V_{th1})/R2$, it is $I_{R2}=I_{FB}$ and $I_S=0$. The output of CO4 is high and the single-pole double-throw switch SPDT connects the non-inverting input to $V_{V1}>V_{V2}$, so that the oscillator swing is $\Delta Vosc=3.9−V_{V1}$. As $V_{STBY}=V_{th1}$ and the output of CO4 goes low and the swing $\Delta Vosc$ increases by the difference $V_{V1}−V_{V2}$, thus originating a step reduction in $f_{osc}(I_{FB})$.

Once more, the resulting frequency decrease will force the feedback loop to react by increasing $I_{FB}$ to compensate for the sudden increase of energy delivery, so $V_{STBY}$ will quickly fall down to $V_{th}$ ($<V_{th1}$), thus triggering the same series of events as in the previous cases.

Among the five nonlinearities considered so far, the nonlinearity "A" has the advantage of leaving the CCO unchanged but appears to be the least effective since it exercises just a mild clamping action on the oscillator frequency. Additionally, it has the least flexibility: it is just a fixed change of slope to zero. All the others appear to be more effective because they exercise a stronger action on the oscillator frequency (they actually reverse the feedback from negative to positive) and the intensity of their action can be adjusted by changing either the mirroring ratios or the switched reference voltages.

The nonlinearity "C" has also the advantage of keeping the CCO unchanged but introduces a fixed jump in the oscillator frequency proportional to the minimum switching frequency $f_{osc}.min=f_{osc}(0)$ (refer to equations 1 and 3) and not to the switching frequency in the discontinuity point $f_{osc}(I_{FB}.a)$. This means that, depending on the frequency range, this discontinuity could be too large in some cases or too small in others. Programming the amplitude of the discontinuity with an external circuit could be a solution but would employ an additional dedicated pin, which might not be available. The discontinuity "C", therefore, will not be considered for integration.

The simplest implementation seems to be that of the nonlinearity "D", in particular the circuit in FIG. 12, in which are added just a comparator CO4 and the switch SPDT2. The experimental verifications have been therefore focused on nonlinearity "D", although nonlinearities "B" and "E" look promising in terms of performance too and are definitely worth further investigations.

Figure 16:
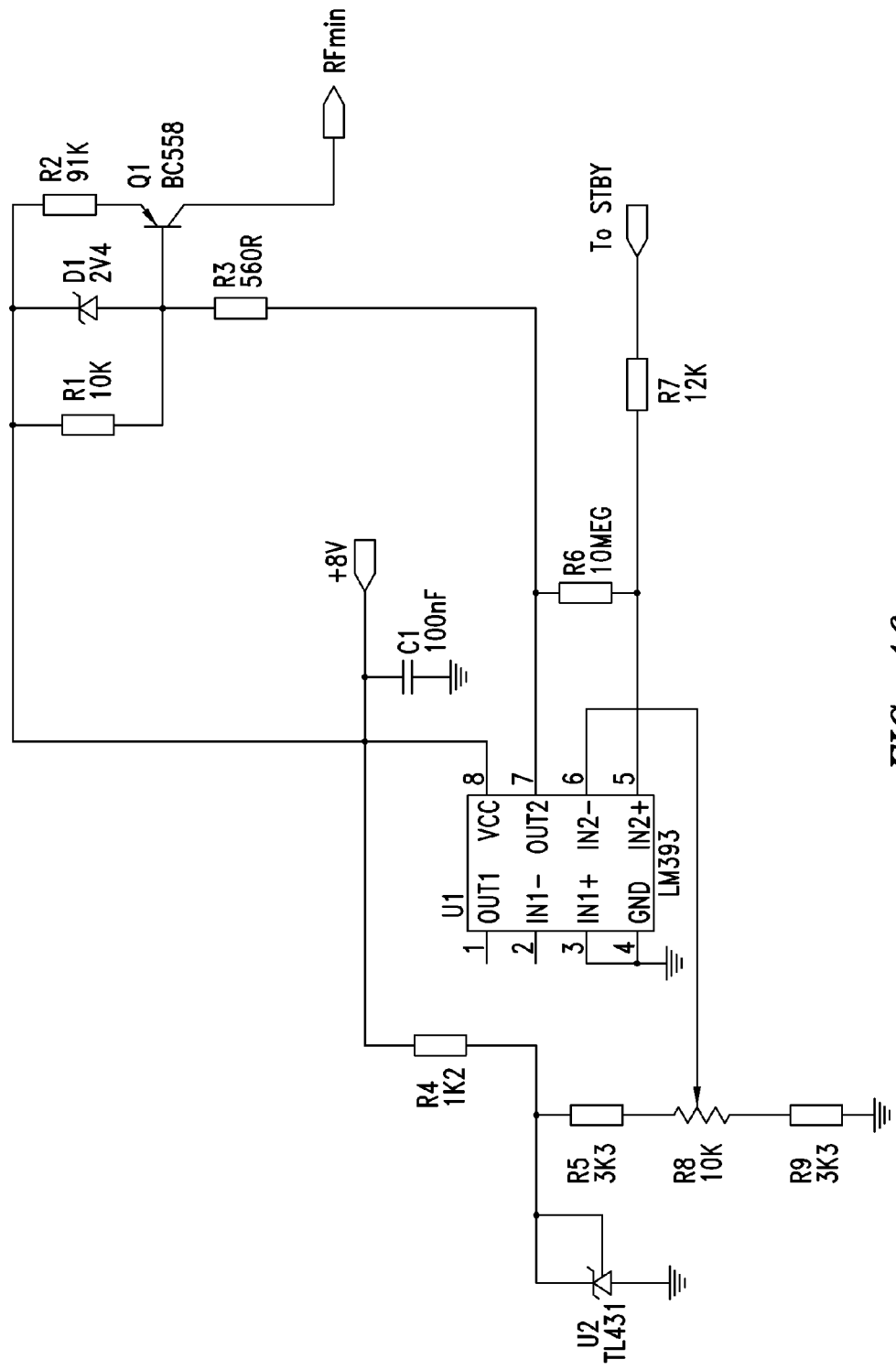
FIG. 16 shows an external circuit that used for testing purposes, to implement a nonlinearity of type "C" in the $f_{osc}(I_{FB})$ function of STMicroelectronics resonant converter controller L6599.

To evaluate the effectiveness in terms of light load efficiency improvement an experiment has been realized using an external circuit to simulate that kind of nonlinearity. To this purpose, the circuit of FIG. 16 has been built and connected to the resonant controller L6599 mentioned earlier, and the effectiveness evaluated on a 90 W LLC resonant converter (Vin=400 V, Vout=19 V).

The circuit is composed of a current generator (R3, R4, D4, Q26) that sources about 20 μA when the base of Q26 is pulled low via R5 by the output of one of the comparators included in the LM393. This comparator receives on its inverting input a reference voltage generated by the shunt regulator TL431 and the adjustment circuit composed of R6, R9 and the potentiometer R8. The non-inverting input is connected to STBY through R7 that, in combination with R10 provides the comparator with a small hysteresis. R8 has been tuned to the values of $V_{th}$ and the hysteresis $V_H$ of CO1 in the L6599, to properly set the position of $I_{FB}.a$ at $(Vr−V_{th}−V_H)/R4$.

When transistor Q26 is turned on, the current IR has a sudden 20 μA negative step change. 20 μA is about 10% of IR when $I_{FB}=I_{FB}.a$. This causes an equal change in the charge/discharge current of C1 (in the L6599, KM=1) and, therefore, a proportional reduction in the switching frequency, which triggers the above described reversal of the feedback sign and pushes $V_{STBY}$ below $V_{th}$.

It is worth noticing that this circuit implements the nonlinearity "C" and not the nonlinearity "D". In fact, the circuit of FIG. 16, although similar in concept to the circuit in FIG. 10, subtracts a fixed amount of current, so it creates a discontinuity in $f_{osc}(I_{FB})$ but leaves its slope unchanged. However, as previously highlighted, for small discontinuities like in our case they are almost indistinguishable, so their difference in terms of performance is not expected to be significant.

Figure 17:
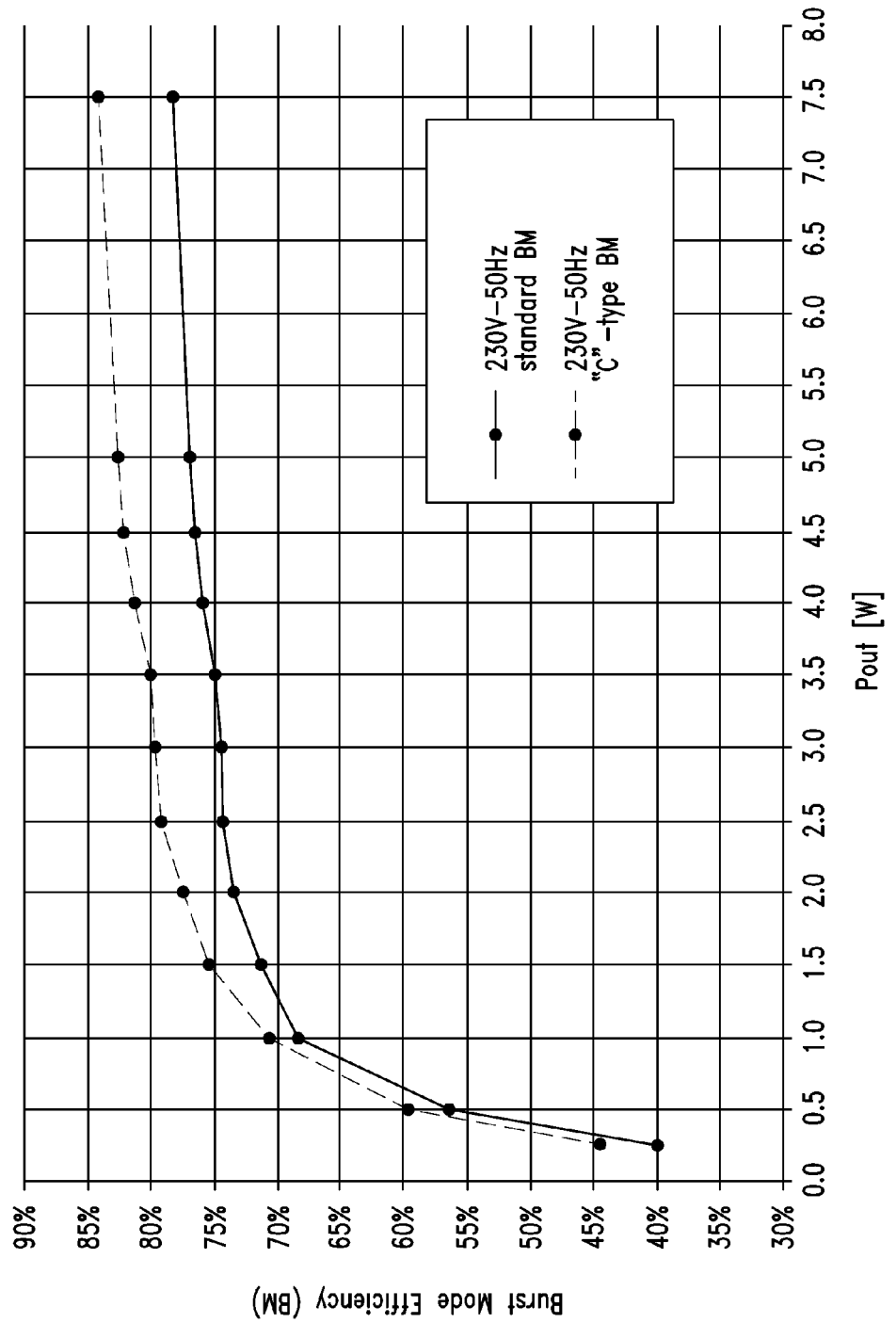
FIG. 17 shows evaluation data of the light-load efficiency observed in a 90 W LLC resonant converter based on STMicroelectronics controller L6599 with the external circuit of FIG. 16, as compared to the same controller in a conventional circuit.
Figure 18:
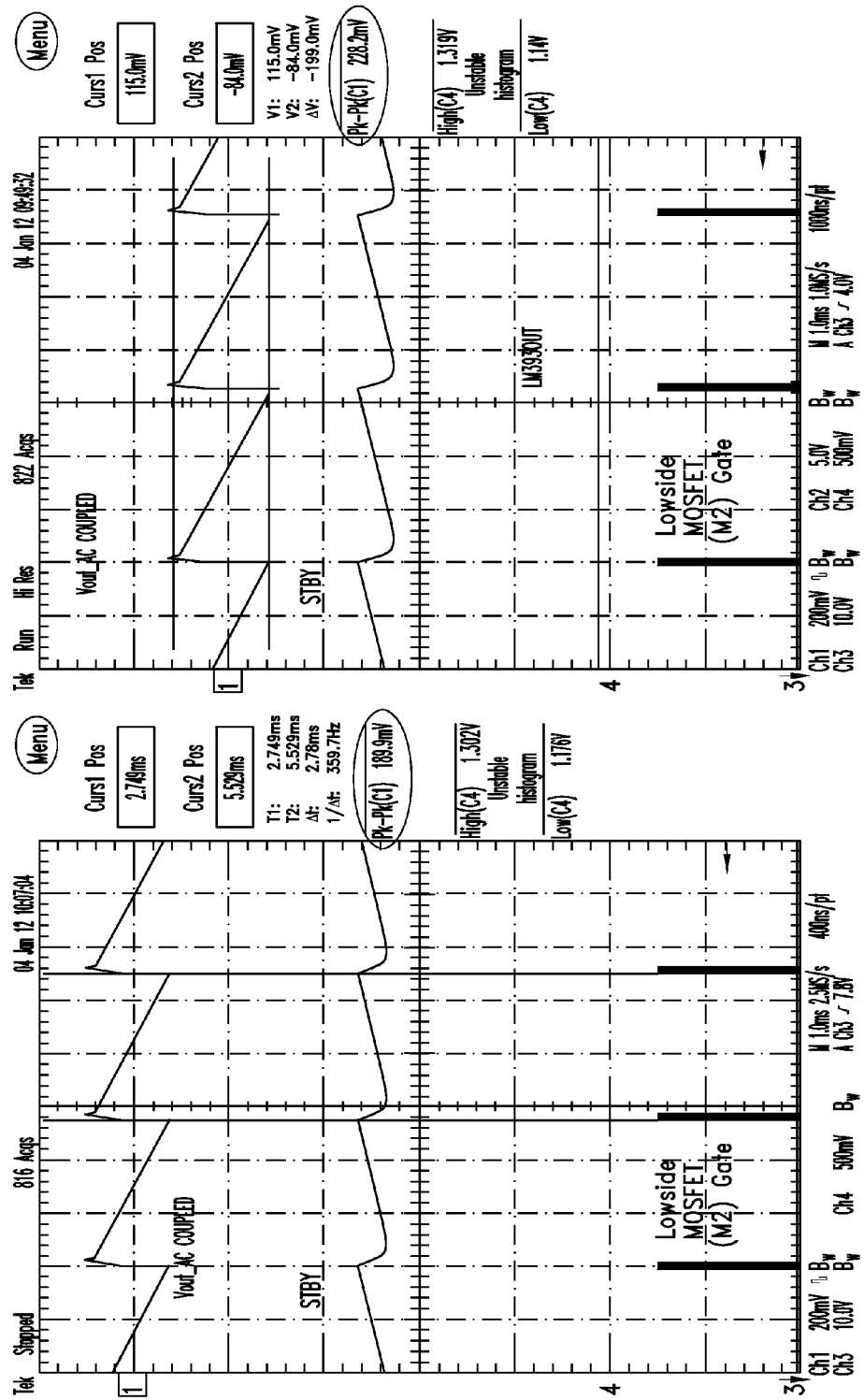
FIG. 18 are oscilloscope screen shots showing that the increase in the output voltage ripple caused by the circuit in FIG. 16 is acceptably low.

The results of the bench evaluation of the experimental converter are summarized in the graph of FIG. 17, where the efficiency with and without the external circuit are compared. The load range taken into consideration goes from 0.25 to 7.5 W, i.e., from 0.28% to 8.3% of the nominal load. In this range the external circuit has brought an efficiency rise around 5% on average. As shown in the oscilloscope pictures of FIG. 18, the increase in the output voltage ripple is moderate and, for most applications, tolerable: from 1% to 1.2% of Vout.

One skilled in the art will recognize that corresponding voltage-controlled oscillators could be used in place of the current-controlled oscillators discussed above.

REFERENCES

[1] B. Wang, X. Xin, S. Wu, H. Wu, J. Ying, "Analysis and Implementation of LLC Burst Mode for Light Load Efficiency Improvement", Applied Power Electronics Conference and Exposition, 2009. APEC 2009. Twenty-Fourth Annual IEEE, Page(s): 58-64.

[2] J. Qin, Z. Moussaoui, J. Liu, G. Miller, "Light Load Efficiency Enhancement of a LLC Resonant Converter", Applied Power Electronics Conference and Exposition (APEC), 2011 Twenty-Sixth Annual IEEE, Page(s): 1764-1768

[3] F. Weiyi, F. C. Lee, P. Mattavelli, H. Daocheng, C. Prasantanakorn, "LLC resonant converter burst mode control with constant burst time and optimal switching pattern", Applied Power Electronics Conference and Exposition (APEC), 2011 Twenty-Sixth Annual IEEE, Page(s): 6-12

[4] Y. Liu, "High Efficiency Optimization of LLC Resonant Converter for Wide Load Range". Thesis, Virginia Polytechnic Institute and State University, 2007.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
controlling burst-mode operation of a converter having an oscillator configured to set a switching frequency of on-off driven power switches of the converter in response to a feedback control signal based on an output error voltage of the converter;
operating the oscillator, when a load on the converter is light, relative to a maximum capacity of the converter, in a hysteretically controlled burst-mode including causing said oscillator to stop oscillating when said feedback control signal reaches a first threshold value; and
introducing a nonlinearity in a derivative of a functional relation between the switching frequency and said feedback control signal, while the feedback control signal is between a lower, second threshold value, and the first threshold value and the oscillator is not in the burst-mode, such that the switching frequency remains equal to or smaller than a value of the switching frequency when the feedback control signal is equal to the second threshold value.

2. The method of claim 1, wherein decreasing the switching frequency while the feedback control signal is between the second threshold value and the first threshold value is limited to within a tolerable output voltage ripple of the converter.

3. The method of claim 1, wherein said feedback control signal is a current sunk by an opto-coupling device transferring a feedback control voltage, output by an error amplifier of a closed-loop negative feedback, across an isolation boundary of the converter.

4. The method of claim 1, wherein introducing the nonlinearity comprises maintaining the functional relation continuous and causing a discontinuity in the derivative of the functional relation.

5. The method of claim 1, wherein introducing the nonlinearity comprises producing a discontinuity in the functional relation between the switching frequency and the feedback control signal.

6. The method of claim 1, wherein said introducing a nonlinearity includes producing discontinuities in the functional relation between the switching frequency and the feedback control signal and in the derivative of the functional relation.

7. A resonant converter, comprising:
an input voltage source node;
a ground terminal;
a totem-pole of power switches electrically coupled between the input voltage source node and the ground terminal and electrically coupled to each other by an intermediate node;
a resonant tank circuit electrically coupled to the intermediate node and including:
a capacitor, a first inductance, and a second inductance;
a transformer having a primary winding and a center-tap secondary that includes first and second windings;
first and second output diodes having respective anodes respective electrically coupled to the first and second windings and respective cathodes; and
a parallel circuit electrically coupled to the cathodes of the first and second output diodes and including an output capacitor and a resistance configured to flow an output current; and
an on-off driver circuit configured to drive said switches and including:
an oscillator configured to set a switching frequency of the resonant converter as a function of an output voltage feedback control signal, and
a hysteretic control circuit configured to implement a burst-mode at light load when said feedback control signal reaches a first threshold value, causing said oscillator to stop oscillating, said hysteretic control circuit being configured to introduce a nonlinearity in a derivative of a functional relation between the switching frequency and said feedback control signal when the feedback control signal exceeds a second, lower threshold value while the oscillator is not in the burst-mode, such that the switching frequency remains equal to or smaller than a value of the switching frequency when the feedback control signal is equal to the second threshold value.

8. The resonant converter of claim 7, further comprising:
an error amplifier of a closed-loop negative feedback, the error amplifier being configured to output a feedback control voltage; and
an opto-coupling device configured to sink a current as said output voltage feedback control signal and transfer the feedback control voltage across an isolation boundary of the resonant converter.

9. The resonant converter of claim 8, comprising a timing capacitor, wherein:
said oscillator comprises:
a dedicated input pin;
first and second current mirrors electrically coupled to the timing capacitor; and
a first clamp circuit coupling at least one of the first and second current mirrors to the dedicated input pin and configured to make a charge and/or discharge current of said timing capacitor proportional to a current sunk through said dedicated input pin, and
said hysteretic control circuit includes a second clamp circuit.

10. The resonant converter of claim 8, comprising a timing capacitor, wherein:
said current controlled oscillator comprises:
a dedicated input pin,
first and second current mirrors electrically coupled to the timing capacitor,
a first clamp circuit coupling at least one of the first and second current mirrors to the dedicated input pin and configured to make a charge and/or discharge current of said timing capacitor proportional to a current sunk through said dedicated input pin, and
a hysteresis switch configured to couple an input of the first clamp circuit alternately to first and second reference voltages; and
said hysteretic control circuit includes a comparator configured to compare a feedback voltage, based on the output voltage feedback control signal, with a threshold voltage, and control the hysteresis switch.

11. The resonant converter of claim 8, comprising a timing capacitor, wherein:
said oscillator comprises:
a dedicated input pin,
first and second current mirrors electrically coupled to the timing capacitor, and
a first clamp circuit coupling at least one of the first and second current mirrors to the dedicated input pin and configured to make a charge and/or discharge current of said timing capacitor proportional to a current sunk through said dedicated input pin, and
said hysteretic control circuit includes a comparator configured to modify a transfer ratio of at least one of said current mirrors.

12. The resonant converter of claim 7, wherein said hysteretic control circuit is configured to limit any decrement of the switching frequency occurring while the feedback control signal is between the second threshold value and the first threshold value to within a tolerable output voltage ripple of the resonant converter.

13. A method, comprising:
in a converter, providing a feedback signal at a magnitude that is inversely related to a power demand of the converter;
increasing a power output of the converter by decreasing a switching frequency of the converter and decreasing the power output of the converter by increasing the switching frequency;
controlling the switching frequency in direct, substantially linear relation to the magnitude of the feedback signal;
shifting the converter to an idle condition when the feedback signal exceeds a first threshold; and
introducing a nonlinearity into a derivative of the relation of the switching frequency and the magnitude of the feedback signal when the feedback signal exceeds a second threshold, lower than the first threshold, while the hysteretic control circuit is not in the burst-mode.

14. The method of claim 13, wherein introducing the nonlinearity comprises preventing the switching frequency from increasing while the feedback signal magnitude is above the first threshold.

15. The method of claim 13, wherein introducing the nonlinearity comprises holding the switching frequency at a constant value while the feedback current magnitude is between the first and second thresholds.

16. The method of claim 13, wherein introducing the nonlinearity comprises controlling the switching frequency in inverse relation to the magnitude of the feedback signal while the magnitude is between the first and second thresholds.

17. The method of claim 13, wherein introducing the nonlinearity comprises reducing the switching frequency sharply when the magnitude of the feedback signal increases across the second threshold.

18. The method of claim 13, wherein shifting the converter to an idle condition comprises shifting the converter from a burst condition to the idle condition when the feedback signal exceeds the first threshold, the method further comprising shifting the converter to the burst condition when, while the converter is in the idle condition, the feedback signal drops below a third threshold, lower than the first threshold.

19. The method of claim 18, wherein the second threshold is lower than the third threshold.

20. A device, comprising:
an oscillator having an input configured to receive a control signal and an output configured to provide a switching control signal at a frequency that is related to a value of the control signal; and
a burst mode control circuit configured to introduce a nonlinearity into a derivative of a relation of the switching control signal frequency and the control signal in response to detecting that the control signal is greater than a first threshold, and to shift the oscillator to a burst mode in response to detecting that the control signal is greater than a second threshold, higher than the first threshold, wherein the burst mode control circuit is configured to introduce the nonlinearity into the derivative of the relation of the switching control signal frequency and the control signal while the oscillator is not in the burst mode.

21. The device of claim 20, further comprising a resonant converter having first and second power switches configured to switch at a rate controlled by the switching control signal of the oscillator and a feedback circuit configured to control a value of the control signal according to a value of an error voltage at an output of the resonant converter.

22. The device of claim 21, wherein the oscillator is configured to provide the switching control signal at a frequency that is directly related to the value of the control signal, and the feedback circuit is configured to control the value of the control signal in inverse relation to the value of the error voltage.

23. The device of claim 20, wherein the burst mode control circuit is configured the prevent the frequency of the switching control signal from increasing while the control signal is greater than the first threshold.

24. A resonant converter, comprising:
an input voltage source node;
a ground terminal;
a totem-pole of power switches electrically coupled between the input voltage source node and the ground terminal and electrically coupled to each other by an intermediate node;

a resonant tank circuit electrically coupled to the intermediate node and including:
a capacitor, a first inductance, and a second inductance;
a transformer having a primary winding and a center-tap secondary that includes first and second windings;
first and second output diodes having respective anodes respective electrically coupled to the first and second windings and respective cathodes;
a parallel circuit electrically coupled to the cathodes of the first and second output diodes and including an output capacitor and a resistance configure to flow an output current;
an on-off driver circuit configured to drive said switches and including:
a timing capacitor;
an oscillator configured to set a switching frequency of the resonant converter as a function of an output voltage feedback control signal, the oscillator comprising:
a dedicated input pin,
first and second current mirrors electrically coupled to the timing capacitor,
a first clamp circuit coupling at least one of the first and second current mirrors to the dedicated input pin and configured to make a charge and/or discharge current of said timing capacitor proportional to a current sunk through said dedicated input pin, and
a hysteresis switch configured to couple an input of the first clamp circuit alternately to first and second reference voltages; and
a hysteretic control circuit configured to implement a burst-mode at light load when said feedback control signal reaches a first threshold value, causing said oscillator to stop oscillating, said hysteretic control circuit being configured to introduce a nonlinearity in a functional relation between the switching frequency and said feedback control signal or in a derivative of the functional relation when the feedback control signal exceeds a second, lower threshold value, such that the switching frequency remains equal to or smaller than a value of the switching frequency when the feedback control signal is equal to the second threshold value, said hysteretic control circuit includes a comparator configured to compare a feedback voltage, based on the output voltage feedback control signal, with a threshold voltage, and control the hysteresis switch;
an error amplifier of a closed-loop negative feedback, the error amplifier being configured to output a feedback control voltage; and
an opto-coupling device configured to sink a current as said output voltage feedback control signal and transfer the feedback control voltage across an isolation boundary of the resonant converter.

\* \* \* \* \*